(12) United States Patent
Kidachi

(10) Patent No.: US 10,383,290 B2
(45) Date of Patent: Aug. 20, 2019

(54) EMITTER AND DRIP IRRIGATION TUBE

(71) Applicant: Enplas Corporation, Saitama (JP)

(72) Inventor: Masahiro Kidachi, Saitama (JP)

(73) Assignee: Enplas Corporation, Saitama (JP)

(*) Notice: Subject to any disclaimer, the term of this patent is extended or adjusted under 35 U.S.C. 154(b) by 329 days.

(21) Appl. No.: 15/110,518

(22) PCT Filed: Jan. 6, 2015

(86) PCT No.: PCT/JP2015/050082
§ 371 (c)(1),
(2) Date: Jul. 8, 2016

(87) PCT Pub. No.: WO2015/105082
PCT Pub. Date: Jul. 16, 2015

(65) Prior Publication Data
US 2016/0330917 A1    Nov. 17, 2016

(30) Foreign Application Priority Data

Jan. 10, 2014  (JP) .................... 2014-003264

(51) Int. Cl.
*A01G 25/02*  (2006.01)
*A01G 25/16*  (2006.01)

(52) U.S. Cl.
CPC ............ *A01G 25/023* (2013.01); *A01G 25/16* (2013.01); *Y02A 40/237* (2018.01)

(58) Field of Classification Search
CPC ...... A01G 25/023; A01G 25/16; A01G 25/02; A01G 25/026; A01G 25/06; A01G 2025/006; Y02A 40/237

(Continued)

(56) References Cited

U.S. PATENT DOCUMENTS 4,161,291 A    7/1979  Bentley
4,687,143 A    8/1987  Gomey et al.
(Continued)

FOREIGN PATENT DOCUMENTS

EP    2901851 A1    8/2015
JP    5-276842 A    10/1993
(Continued)

OTHER PUBLICATIONS

Extended European Search Report for 15735077.8 dated Jul. 28, 2017.
(Continued)

*Primary Examiner* — Arthur O. Hall
*Assistant Examiner* — Steven M Cernoch
(74) *Attorney, Agent, or Firm* — Brundidge & Stanger, P.C.

(57) ABSTRACT

Provided is an emitter (120) comprising a flow path that leads from an intake path (221) for taking in irrigation liquid that is within a tube to a recessed section (252). The flow path comprises opening/closing sections (248) that are arranged with a gap (249) therebetween. The gap (249) communicates with a discharge section. When the opening/closing sections (248) are pushed by the pressure of the irrigation fluid within a recessed section (242), the tip sections of each of the opening/closing sections (248) are brought into contact and one part of the gap (249) is blocked. The flow rate of the irrigation fluid within the emitter (120) is controlled by the remaining amount of said irrigation fluid that is capable of passing through the gap (249).

8 Claims, 21 Drawing Sheets

(58) Field of Classification Search
USPC .................................................. 239/542, 547
See application file for complete search history.

(56) References Cited

U.S. PATENT DOCUMENTS

| | | | | |
|---|---|---|---|---|
| 5,203,503 | A | * | 4/1993 | Cohen .................. A01G 25/023 239/1 |
| 5,246,170 | A | | 9/1993 | Woidt |
| 6,027,048 | A | | 2/2000 | Mehoudar |
| 6,213,408 | B1 | | 4/2001 | Shekalim |
| 6,302,338 | B1 | | 10/2001 | Cohen |
| 6,568,607 | B2 | * | 5/2003 | Boswell ............... A01G 25/023 239/542 |
| 7,648,085 | B2 | * | 1/2010 | Mavrakis ............. A01G 25/023 138/40 |
| 2005/0258278 | A1 | * | 11/2005 | Cohen .................. A01G 25/023 239/542 |
| 2007/0194149 | A1 | | 8/2007 | Mavrakis et al. |
| 2013/0248622 | A1 | | 9/2013 | Kim |
| 2015/0223414 | A1 | | 8/2015 | Kidachi |

FOREIGN PATENT DOCUMENTS

| | | |
|---|---|---|
| JP | 2010-046094 A | 3/2010 |
| WO | 2011150471 A1 | 12/2011 |
| WO | 2013/175802 A1 | 11/2013 |

OTHER PUBLICATIONS

International Search Report from International Application No. PCT/JP2015/050082 dated Apr. 14, 2015.

* cited by examiner

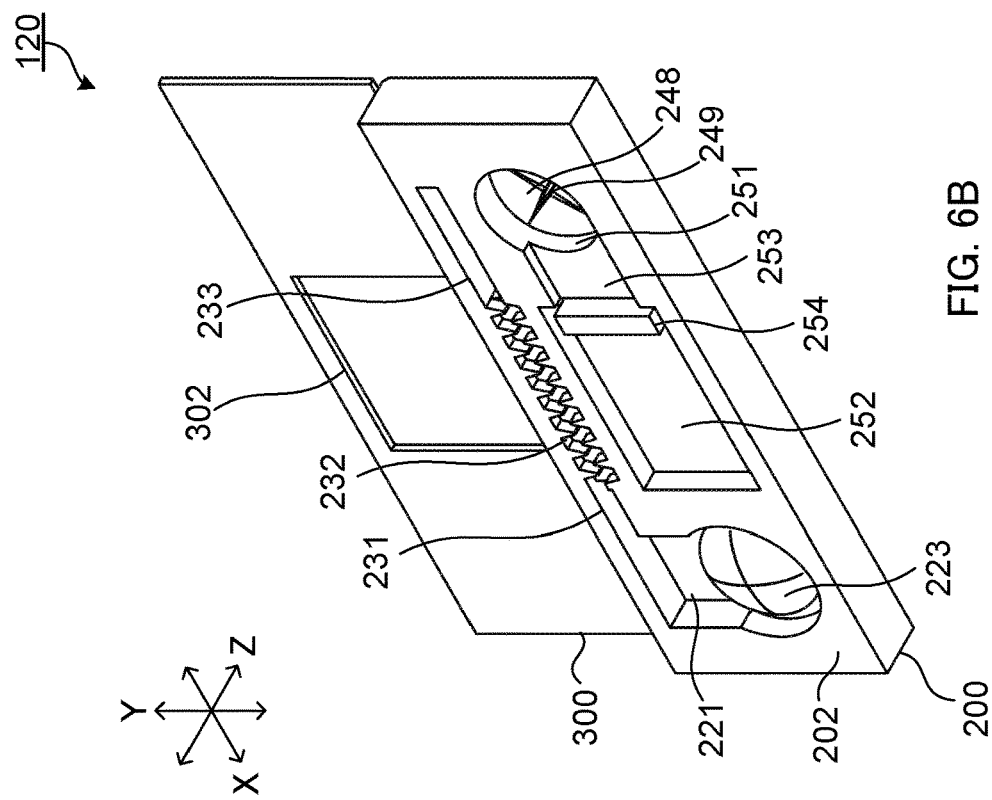
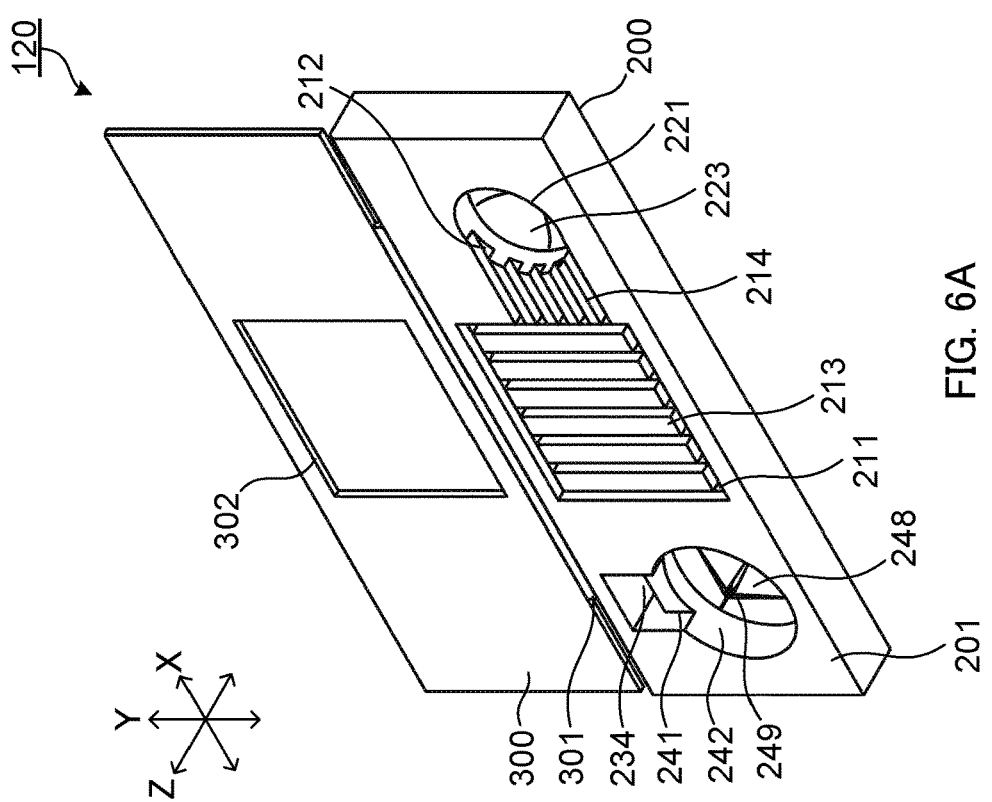
FIG. 6B
FIG. 6A

EMITTER AND DRIP IRRIGATION TUBE

TECHNICAL FIELD

The present invention relates to an emitter and a trickle irrigation tube including the emitter.

BACKGROUND ART

A trickle irrigation method is known as a method for culturing plants. In the trickle irrigation method, for example, a trickle irrigation tube is disposed on the soil in which plants are planted, and irrigation liquid such as water and liquid fertilizer is slowly supplied from the trickle irrigation tube to the soil. The trickle irrigation method can minimize the consumption amount of the irrigation liquid, and has been increasingly attracting attention in recent years.

The trickle irrigation tube typically has a tube and an emitter (also called "dripper"). The emitter typically supplies the soil with the irrigation liquid in the tube at a predetermined rate at which the irrigation liquid is dropped to the soil. Emitters which are pierced into the tube from the outside, and emitters joined to the inner wall surface of the tube are known.

For example, the latter emitter has a channel including a pressure reduction channel for allowing the irrigation liquid having entered the emitter from the internal space of the tube toward the through hole of the tube while reducing the pressure of the liquid, and a diaphragm part configured to change the volume of a portion of the channel where the irrigation liquid having reduced pressure flows in accordance with the pressure of the liquid in the tube. The emitter is composed of a member which is joined to the inner wall surface of the tube, a member which is disposed on the member joined to the inner wall surface, and a diaphragm part which is disposed between the two members. The diaphragm part is composed of an elastic film such as a silicone rubber film (see, for example, PTL 1).

The emitter can suppress variation of the discharge rate of the irrigation liquid regardless of change of the pressure of the irrigation liquid in the tube. Therefore, the emitter is advantageous from the viewpoint of uniformly growing multiple plants.

CITATION LIST

Patent Literature

PTL 1
Japanese Patent Application Laid-Open No. 2010-46094

SUMMARY OF INVENTION

Technical Problem

The emitter is formed by assembling three components. In view of this, the emitter may cause assembling error. In particular, the assembling error of the diaphragm part may cause variation of the operation of the diaphragm part, and variation of the discharge rate of the irrigation liquid.

In addition, the emitter is typically a molded article of an inexpensive resin such as polyethylene and polypropylene, and the diaphragm part is composed of a more expensive elastic material such as a silicone rubber film. The use of components of different materials has a room for improvement in material cost reduction.

Generally, in a trickle irrigation tube, hundreds of emitters are disposed in one tube in some cases. In a long trickle irrigation tube, the supply pressure of irrigation liquid to the tube is required to be increased, and consequently the discharge rate of the irrigation liquid of the emitter may not be stable. In view of this, control of the discharge rate of the irrigation liquid of the emitter in accordance with the pressure of the irrigation liquid in the tube is desired.

Furthermore, from the viewpoint of reducing the material cost and the manufacturing cost of the emitter, an emitter which can be manufactured with a single inexpensive material and fewer number of components is desired.

An object of the present invention is to provide an emitter which can stabilize the discharge rate of the irrigation liquid and can further reduce the manufacturing cost. In addition, another object of the present invention is to provide a trickle irrigation tube having the emitter.

Solution to Problem

The present invention provides an emitter to be disposed on a tube for allowing irrigation liquid to flow therethrough, the emitter being configured for quantitatively discharging the irrigation liquid in the tube to outside of the tube, the emitter including: an intake part for receiving the irrigation liquid in the tube; a pressure reduction channel for allowing the irrigation liquid received from the intake part to flow therethrough while reducing a pressure of the irrigation liquid; a flow rate controlling part for controlling a flow rate of the irrigation liquid supplied from the pressure reduction channel in accordance with a pressure of the irrigation liquid supplied from the pressure reduction channel; a discharging part configured to be supplied with the irrigation liquid which is to be discharged to the outside of the tube and has a flow rate controlled by the flow rate controlling part. The flow rate controlling part includes a gap opening in a linear shape at a channel on a downstream side of the pressure reduction channel and communicated with the discharging part, a movable part having flexibility and including a free end facing the gap and a fixed end, the fixed end having a straight line shape and connecting both ends of the gap, and a protrusion protruding along the free end from the movable part toward the channel on the downstream side; and, when the pressure of the irrigation liquid in the channel is equal to or higher than a predetermined value, the movable part bends and the protrusion reduces a channel area of a channel of the irrigation liquid constituted by the gap.

Furthermore, the present invention provides a trickle irrigation tube of an embodiment of the present invention which includes: a tube; and at least one emitter disposed on the tube, the emitter being the above-mentioned emitter

Advantageous Effects of Invention

The emitter according to the present invention controls the discharge rate of the irrigation liquid in accordance with the pressure of the irrigation liquid in the trickle irrigation tube, and thus can stabilize the discharge rate of the irrigation liquid. In addition, since the emitter according to the present invention can be formed with one or two components by injection molding of a resin material, the manufacturing cost can be further reduced in comparison with conventional emitters composed of three parts.

BRIEF DESCRIPTION OF DRAWINGS

FIG. 6A illustrates a top surface, a front surface and a side surface of the emitter according to the embodiment in the state before a film is joined to an emitter main body, and FIG. 6B illustrates a bottom surface, a front surface and a side surface of the emitter;

DESCRIPTION OF EMBODIMENTS

In the following, embodiments of the present invention are described in detail with reference to the accompanying drawings. It is to be noted that the shapes in plan view, the size, the angle and the pressure in the following embodiments are merely examples, and may be appropriately changed as long as desired functions of the components of the embodiments are achieved.

Embodiment 1

Configuration

Figure 1:
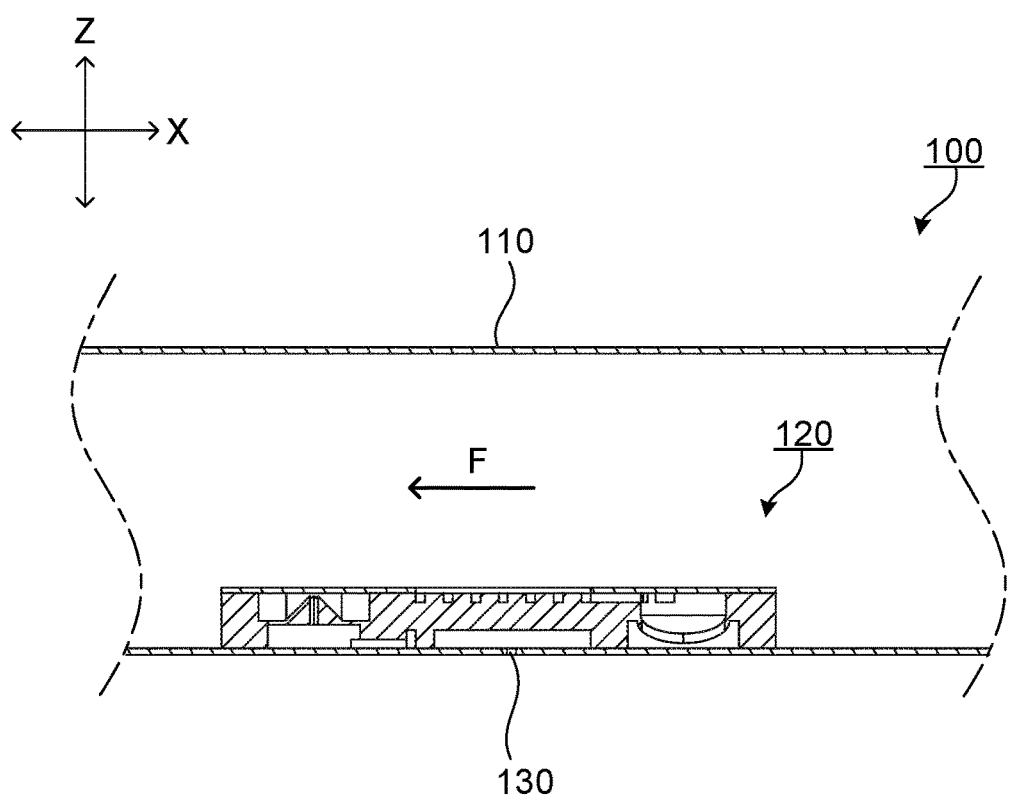
FIG. 1 is a schematic sectional view of a trickle irrigation tube according to a first embodiment of the present invention.

FIG. 1 is a schematic sectional view of a trickle irrigation tube according to Embodiment 1 of the present invention. Trickle irrigation tube 100 is composed of tube 110 and emitter 120. Tube 110 is made of polyethylene, for example. Emitter 120 is disposed at a predetermined interval (for example, 200 to 500 mm) in the axial direction of tube 110. Each emitter 120 is joined on the inner wall surface of tube 110. Emitter 120 is disposed at a position where emitter 120 covers discharge port 130 of tube 110. Discharge port 130 is a hole which extends through the tube wall of tube 110. The hole diameter of discharge port 130 is, for example, 1.5 mm. It is to be noted that arrow F indicates the direction of flow of the irrigation liquid in tube 110.

Figure 2A:
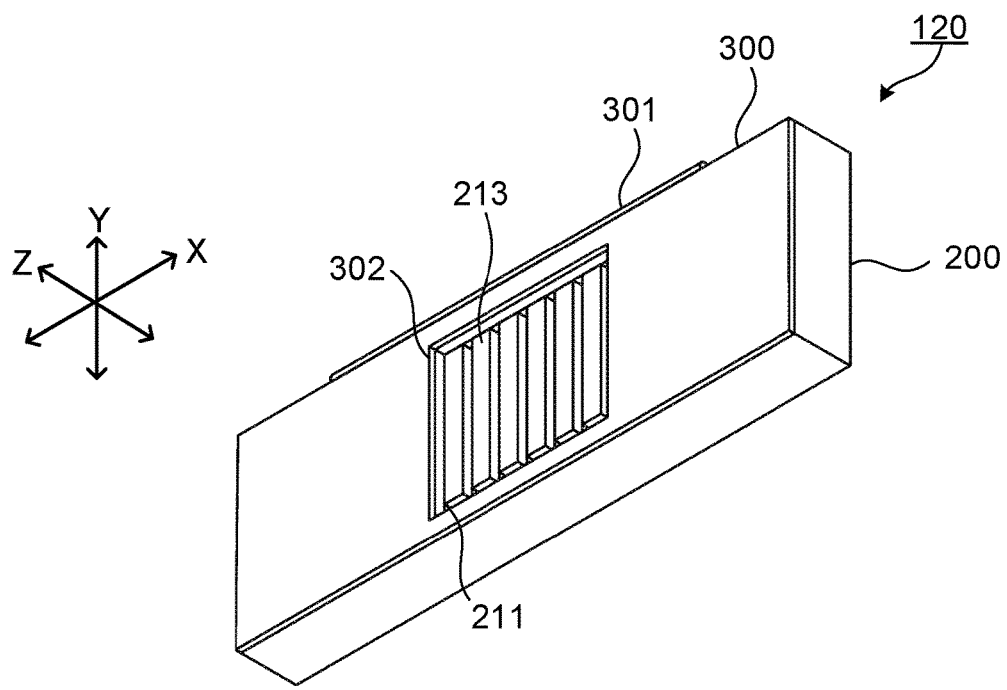
FIG. 2A illustrates a top surface, a front surface and a side surface of an emitter according to the embodiment.
Figure 2B:
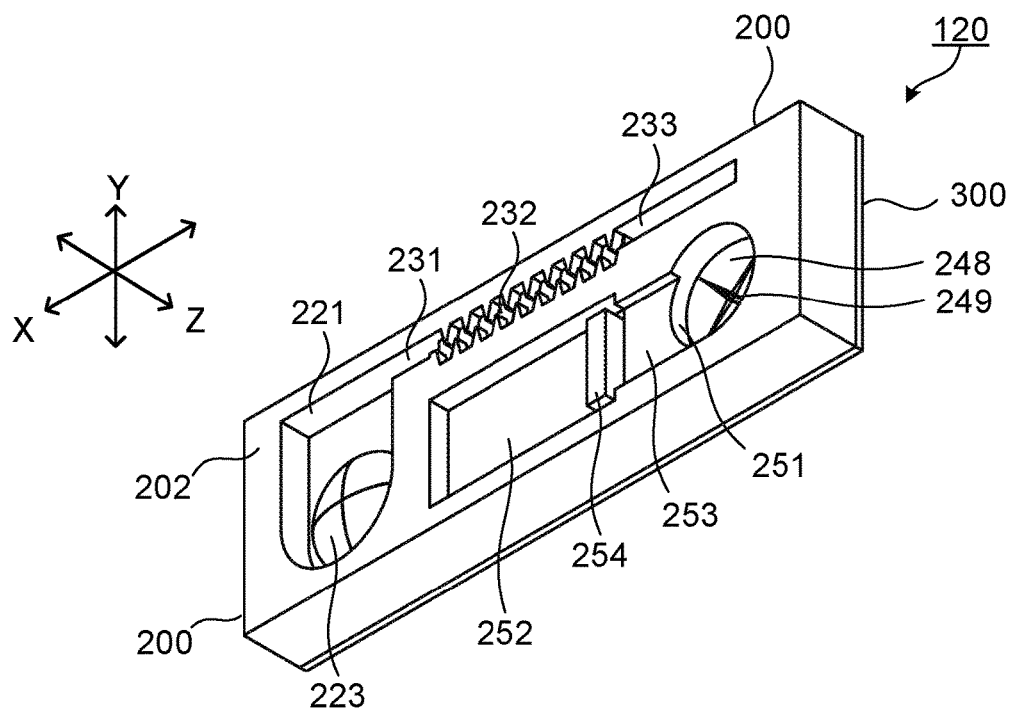
FIG. 2B illustrates a bottom surface, a front surface and a side surface of the emitter.
Figure 3A:
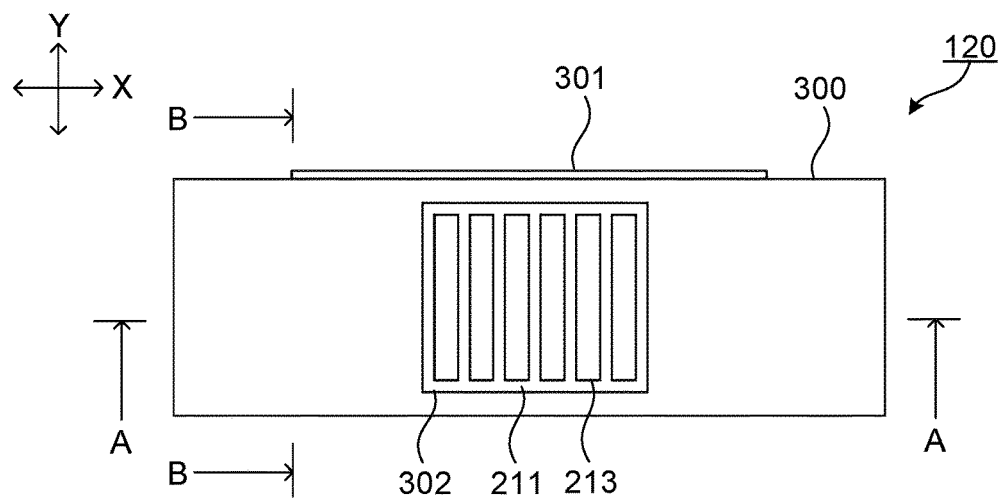
FIG. 3A is a plan view of the emitter according to the embodiment.
Figure 3B:
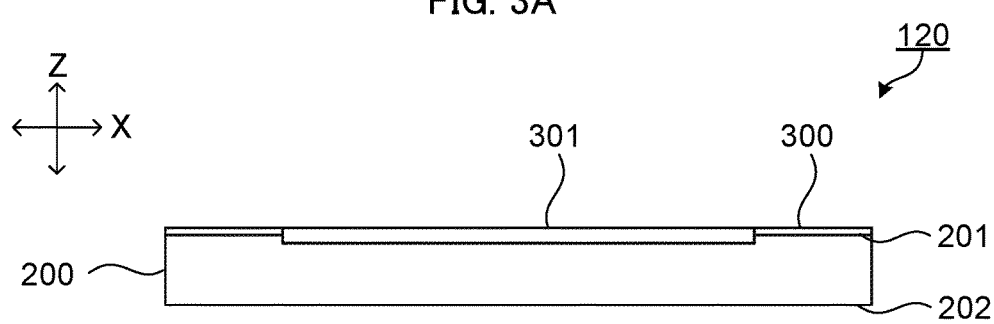
FIG. 3B is a back view of the emitter.
Figure 3C:
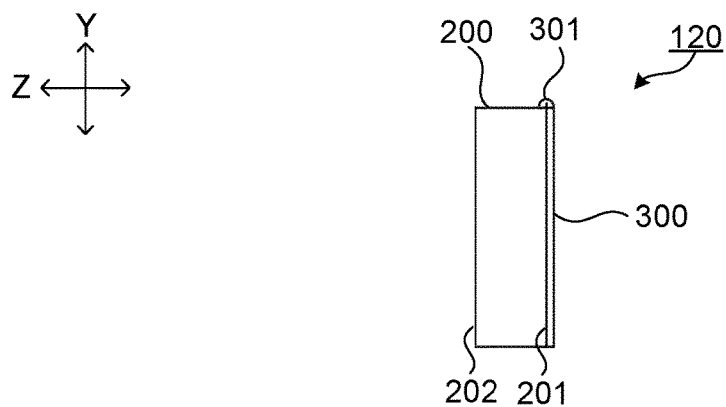
FIG. 3C is a side view of the emitter.
Figure 4A:
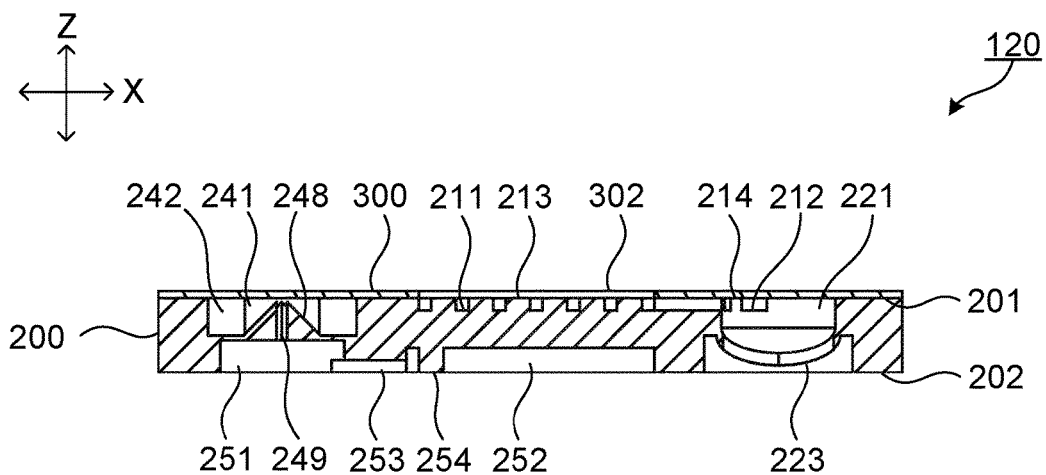
FIG. 4A is a sectional view of the emitter according to the embodiment taken along line A-A of FIG. 3A.
Figure 4B:
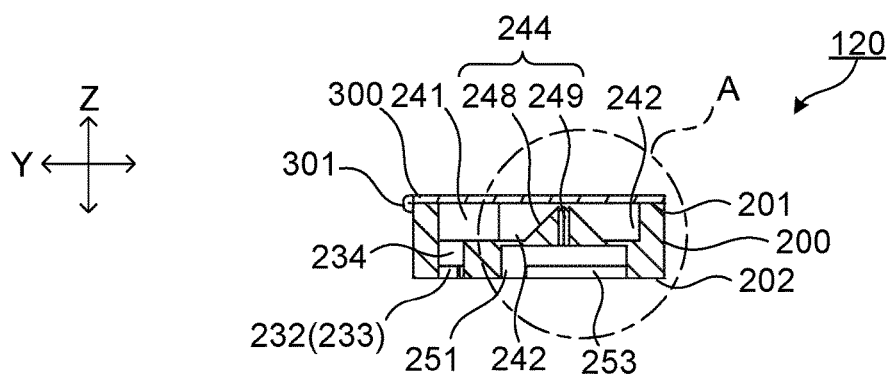
FIG. 4B is a sectional view of the emitter taken along line B-B of FIG. 3A.
Figure 5A:
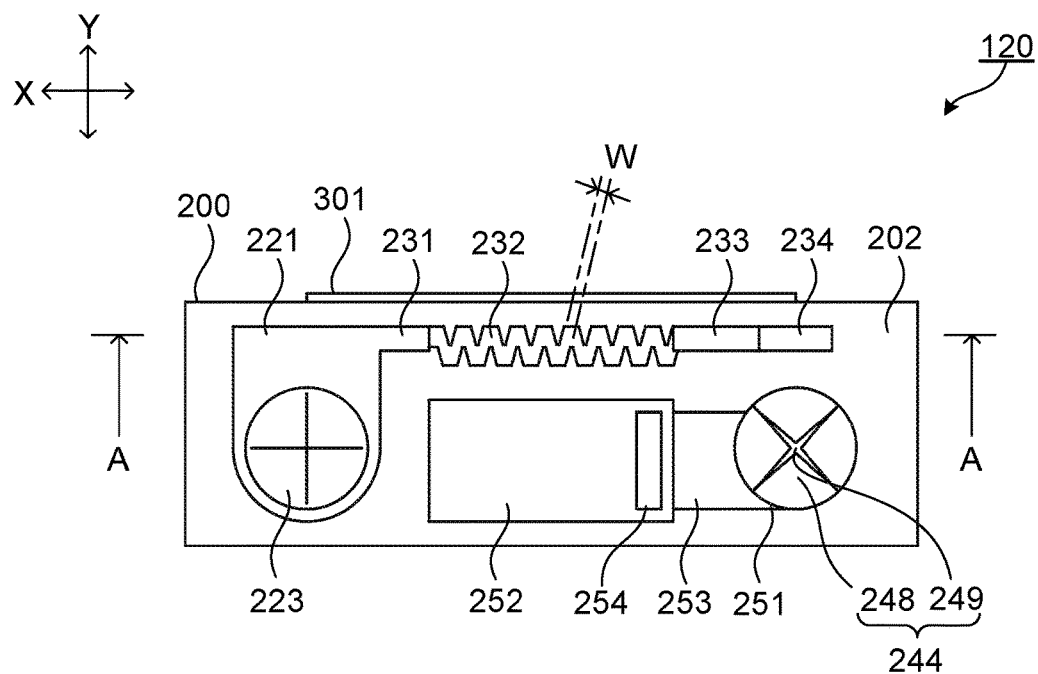
FIG. 5A is a bottom view of the emitter according to the embodiment.
Figure 5B:
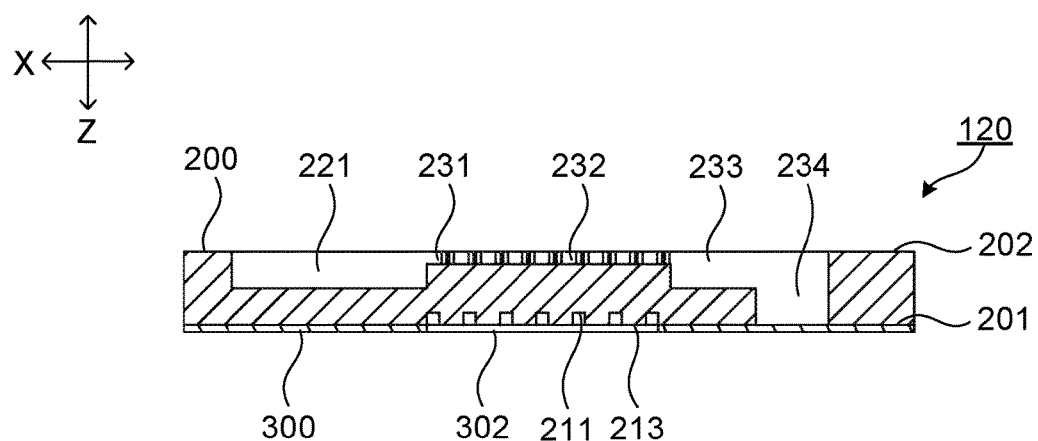
FIG. 5B is a sectional view of the emitter taken along line A-A of FIG. 5A.

FIG. 2A illustrates a top surface, a front surface and a side surface of emitter 120, and FIG. 2B illustrates a bottom surface, a front surface and a side surface of emitter 120. In addition, FIG. 3A is a plan view of emitter 120, FIG. 3B is a rear view of emitter 120, and FIG. 3C is a side view of emitter 120. In addition, FIG. 4A is a sectional view of emitter 120 taken along line A-A of FIG. 3A, and FIG. 4B is a sectional view of emitter 120 taken along line B-B of FIG. 3A. In addition, FIG. 5A is a bottom view of emitter 120, and FIG. 5B is a sectional view of emitter 120 taken along line A-A of FIG. 5A. It is to be noted that the X direction is the axial direction of tube 110 or the longitudinal direction of emitter 120, the Y direction is the short (width) direction of emitter 120, and the Z direction is the height direction of emitter 120. In addition, the direction of arrow F is parallel to the X direction.

As illustrated in FIG. 2A and FIG. 2B, emitter 120 has a cuboid-like external shape. For example, the length of emitter 120 is 30 mm in the X direction, 10 mm in the Y direction, and 3 mm in the Z direction. Emitter 120 includes emitter main body 200 to be joined to the inner wall surface of tube 110, and film 300 which is formed integrally with emitter main body 200.

Figure 7A:
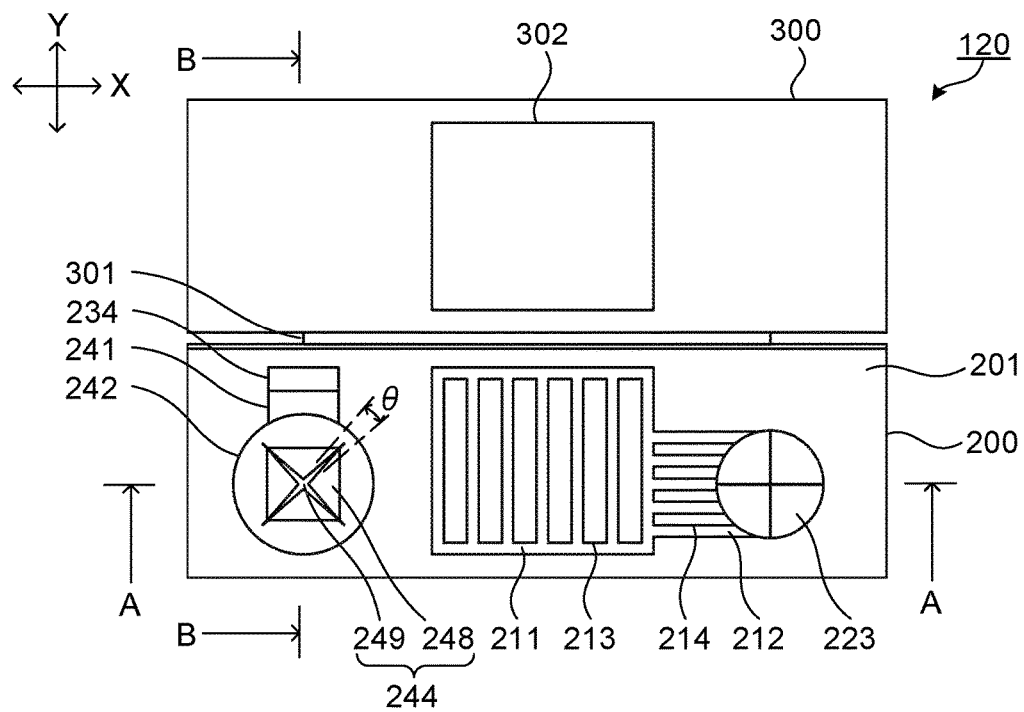
FIG. 7A is a plan view of the emitter according to the embodiment in the state before a film is joined to the emitter main body.
Figure 7B:
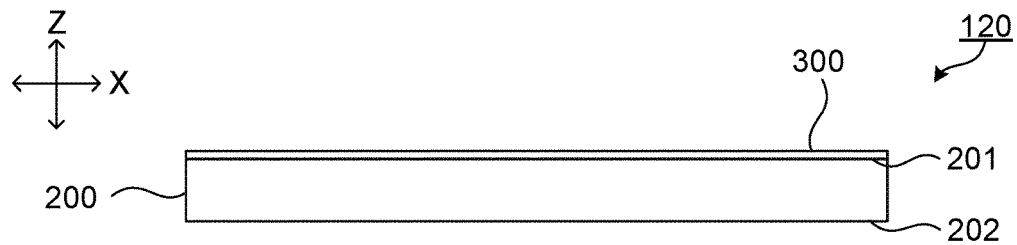
FIG. 7B is a rear view of the emitter.
Figure 7C:
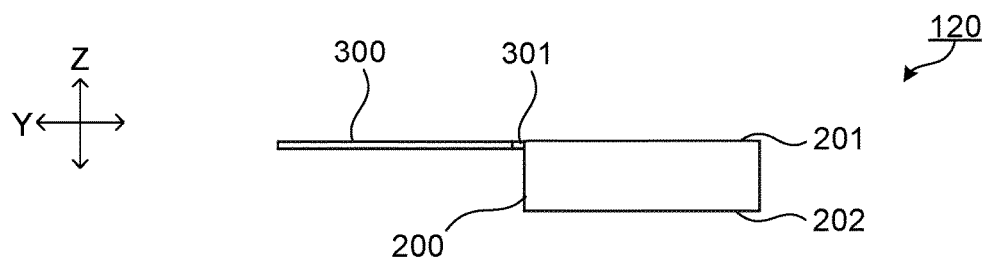
FIG. 7C is a side view of the emitter.
Figure 8A:
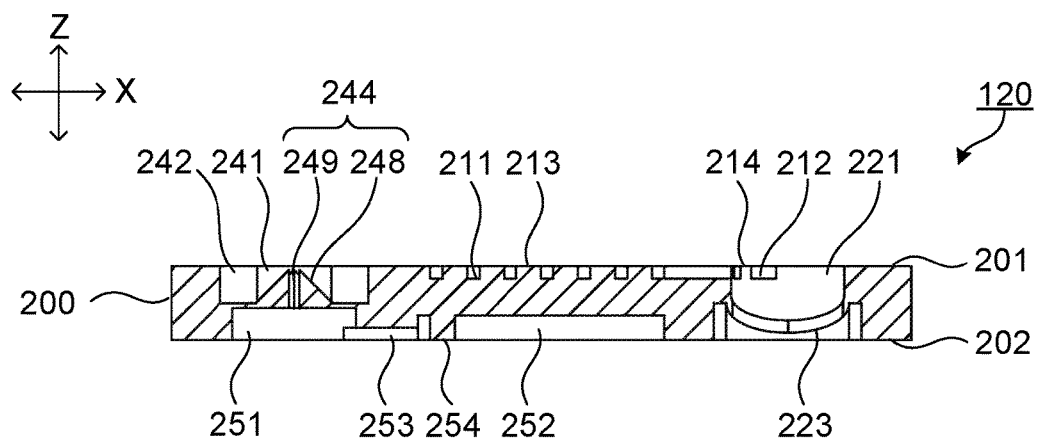
FIG. 8A is a sectional view of the emitter according to the embodiment taken along line A-A of FIG. 7A in the state before the film is joined to emitter the main body.
Figure 8B:
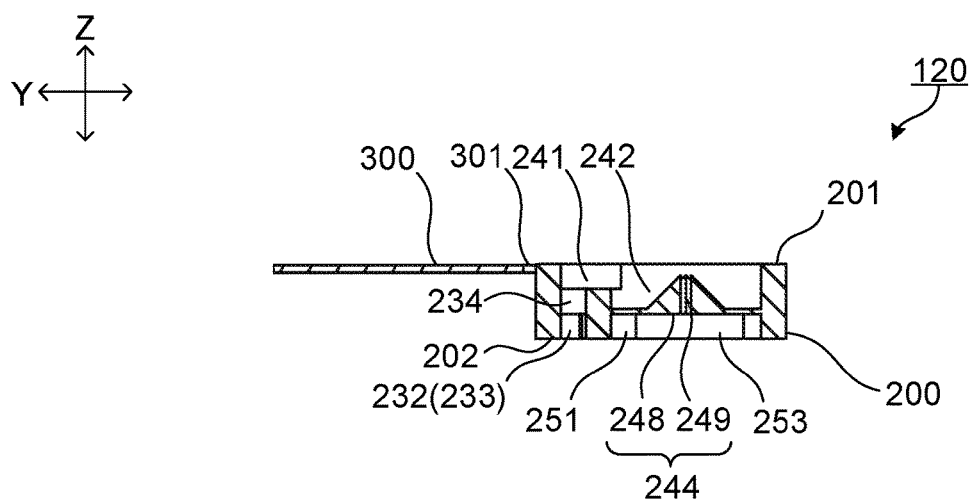
FIG. 8B is a sectional view of the emitter taken along line B-B of FIG. 7A.
Figure 9A:
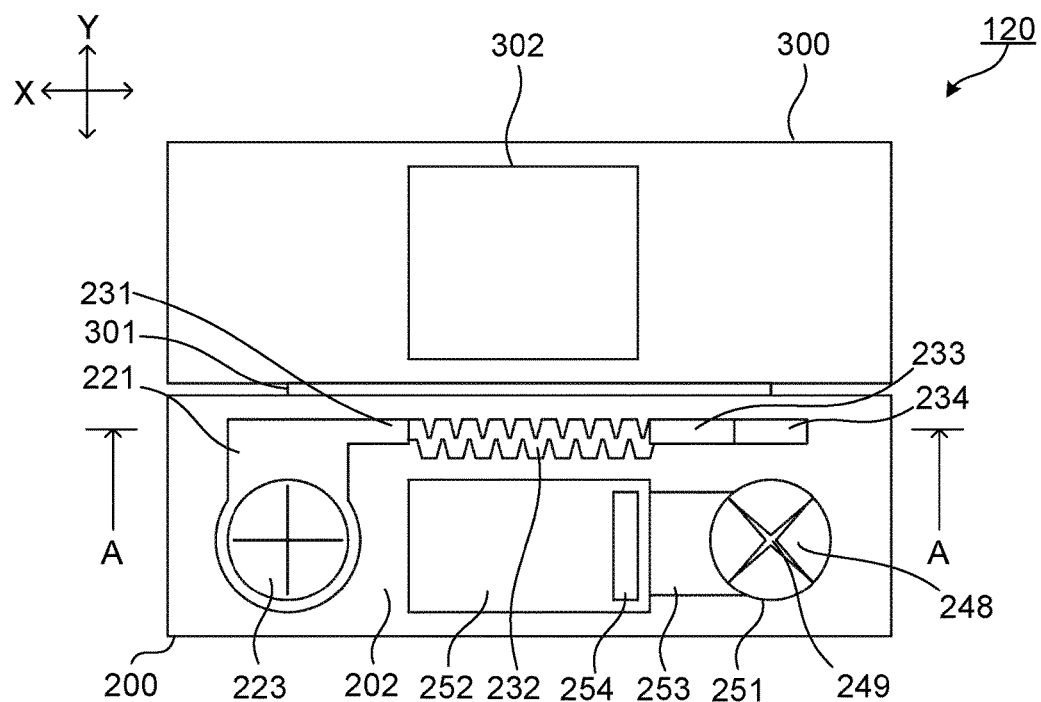
FIG. 9A is a bottom view of the emitter according to the embodiment in the state before the film is joined to an emitter main body.
Figure 9B:
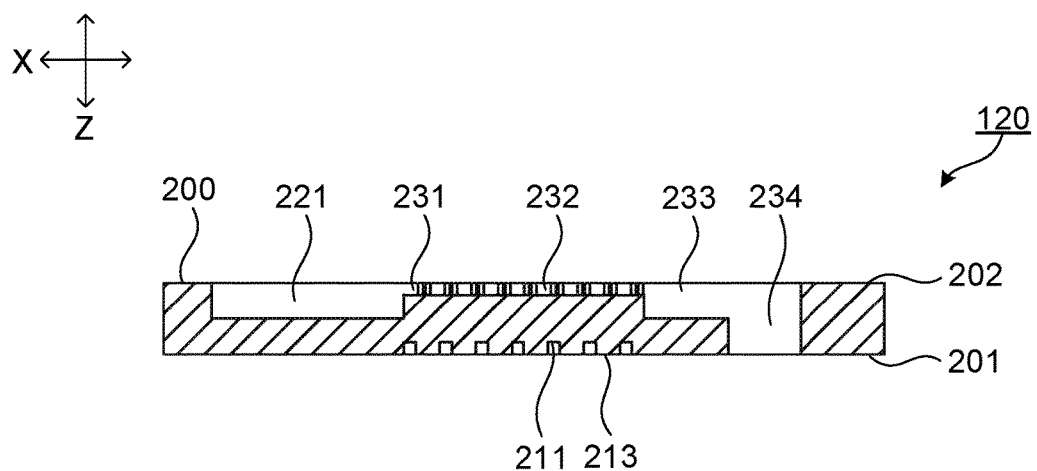
FIG. 9B is a sectional view of the emitter taken along line A-A of FIG. 9A.

FIG. 6A illustrates a top surface, a front surface and a side surface of emitter 120 in the state before film 300 is joined to emitter main body 200, and FIG. 6B illustrates a bottom surface, a front surface and a side surface of emitter 120. In addition, FIG. 7A is a plan view of emitter 120 in the state before film 300 is joined to emitter main body 200, FIG. 7B is a rear view of the emitter 120, and FIG. 7C is a side view of the emitter 120. Further, FIG. 8A is a sectional view of emitter 120 taken along line A-A of FIG. 7A in the state before film 300 is joined to emitter main body 200, and FIG. 8B is a sectional view of the emitter 120 taken along line B-B of FIG. 7A. In addition, FIG. 9A is a bottom view of emitter 120 in the state before film 300 is joined to emitter main body 200, and FIG. 9B is a sectional view of the emitter 120 taken along line A-A of FIG. 9A.

As illustrated in FIG. 3B and FIG. 3C, emitter main body 200 includes first surface 201 and second surface 202. First surface 201 is one surface which is joined to film 300 in the Z direction of emitter main body 200. Second surface 202 is the other surface which is joined to the inner wall surface of tube 110 in the Z direction of emitter main body 200.

As illustrated in FIG. 6A, FIG. 6B, FIG. 7A and FIG. 8A, emitter main body 200 includes recesses 211 and 212 formed on first surface 201, linear protrusions 213 and 214 disposed in recesses 211 and 212, intake channel 221 extending through emitter main body 200 in the Z direction, and flow rate regulation valve 223 disposed in intake channel 221.

As illustrated in FIG. 6A and FIG. 7A, recess 211 is a recess located at a center portion of first surface 201. The shape (hereinafter also referred to as "shape in plan view") of recess 211 as viewed from the Z direction is a rectangular shape.

Recess 212 is a recess located at first surface 201 and configured to connect recess 211 and intake channel 221. As illustrated in FIG. 7B, the length of recess 212 in the Y direction is equal to the diameter of an opening part of intake channel 221 described later.

As illustrated in FIG. 6A and FIG. 7A, linear protrusions 213 are a plurality of linear protrusions disposed in recess 211 side by side in the X direction, and the longitudinal direction of protrusions 213 is aligned in the Y direction. In plan view, linear protrusion 213 has a rectangular shape. A gap is provided between linear protrusions 213 in the X direction, and between linear protrusion 213 and the wall surface of recess 211 in the Y direction.

Linear protrusions 214 are a plurality of linear protrusions disposed side by side in the Y direction in recess 212, and the longitudinal direction of linear protrusions 214 is aligned with the X direction. In plan view, linear protrusion 214 has a shape which is obtained by cutting out one end of a rectangular in an arc shape. A gap is provided between linear protrusions 214 in the Y direction, and between an end of linear protrusion 214 and linear protrusion 213 adjacent to linear protrusion 214 in the X direction.

The distance from the bottom surface of recesses 211 and 212 to the tip end surface of linear protrusions 213 and 214 (the height of linear protrusion 213 and linear protrusion 214, which is the depth of recesses 211 and 212) is, for example, 0.5 mm.

The shape of the opening of intake channel 221 at first surface 201 is a circular shape as illustrated in FIG. 7A. Intake channel 221 has an opening diameter of, for example, 5 mm. As illustrated in FIG. 9A, the shape of the opening of intake channel 221 at second surface 202 is a shape (bell shape) which is formed with a semicircle of the above-mentioned circle and a rectangular which has a width of the diameter of the opening and extends in the Y direction from the diameter of the semicircle.

As illustrated in FIG. 7A and FIG. 9A, flow rate regulation valve 223 is composed of four flexible opening-closing parts which close intake channel 221. As illustrated in FIG. 8A and FIG. 9A, the opening-closing parts have a form in which a substantially hemisphere thin dome protruding from first surface 201 side toward second surface 202 side is divided with slits in a cross shape. The opening-closing part has a thickness of, for example, 0.5 mm, and, normally, the slit has a width of, for example, 0 mm.

As illustrated in FIG. 6B, FIG. 9A and FIG. 9B, emitter main body 200 further includes, on second surface 202, three grooves 231, 232 and 233 and hole 234 communicating between groove 233 and the first surface 201 side.

As illustrated in FIG. 5A and FIG. 9A, groove 231 is connected with intake channel 221. Groove 231 is a linear groove formed on second surface 202 and extending along the X direction.

As illustrated in FIG. 5A and FIG. 9A, groove 232 is connected with groove 231. Groove 232 is a groove formed on second surface 202 and extending along the X direction. In plan view, groove 232 has a zigzag shape. In the zigzag shape, protrusions having a substantially triangular shape protruding from the side surface of groove 232 are alternately disposed along the extending direction (the X direction) of groove 232. The protrusions are disposed such that the tip of each protrusion does not exceed the central line of groove 232 in plan view. Groove 232 has a depth of, for example, 0.5 mm, and groove 232 has a width (W in FIG. 5) of, for example, 0.5 mm.

As illustrated in FIG. 5A and FIG. 9A, groove 233 is connected with groove 232. Groove 233 is a linear groove formed on second surface 202 and extending along the X direction.

As illustrated in FIG. 5A and FIG. 9A, hole 234 opens at an end portion of groove 233. The opening shape of hole 234 is a rectangular shape. As illustrated in FIG. 5B and FIG. 9B, hole 234 opens at first surface 201. Grooves 231 and 233 and hole 234 have a width (the length in the Y direction) of, for example, 1 mm.

As illustrated in FIG. 6A, FIG. 7A and FIG. 8A, emitter main body 200 further includes groove 241 formed on first surface 201, recess 242 formed on first surface 201, and flow rate control valve 244 disposed on the bottom of recess 242.

As illustrated in FIG. 7A, groove 241 is a linear groove formed on first surface 201 and extending along the Y direction and in plan view, groove 241 has a rectangular shape. Hole 234 opens at one end of groove 241 and recess 242 is connected with the other end of groove 241.

As illustrated in FIG. 7A, recess 242 is a bottomed recess formed on first surface 201. In plan view, recess 242 has a circular shape. The opening diameter of recess 242 is, for example, 6 mm, and the depth of recess 242 is, for example, 2 mm Recess 251 described later is located on a side opposite to recess 242 in the Z direction. The bottom of recess 242 has a thickness of, for example, 0.2 mm.

As illustrated in FIG. 7A and FIG. 8B, flow rate control valve 244 has a configuration in which a square pyramid is divided along the sides of the square pyramid with slits in a cross shape into four right angle triangular pyramids. That is, flow rate control valve 244 includes four opening-closing parts 248 and gap 249 formed between each opening-closing parts 248.

As illustrated in FIG. 7A, FIG. 8A and FIG. 8B, opening-closing part 248 has a right angle triangular pyramid-like shape whose bottom surface has a rectangular equilateral triangular shape. In opening-closing part 248, the oblique side of the rectangular equilateral triangle of the bottom is a fixed end, the remaining two sides thereof orthogonal to each other are free ends. Opening-closing part 248 is composed of the bottom surface, a side surface having a right triangular-like shape, and a tilted surface having an isosceles triangular (regular triangular) shape. The side surface has a shape with the short side of the bottom surface having a rectangular equilateral triangular-like shape, a side orthogonal to the bottom surface, and an oblique side connecting the other two sides. The distance between bottom sides of opposite two opening-closing parts 248 (the distance between fixed ends of opposite two opening-closing parts 248, that is, the length of one side of the square pyramid) is, for example, 3.1 mm. In addition, the height of opening-closing part 248 from the bottom of recess 242 is, for example, 1.3 mm. Further, the distance from the apex of opening-closing part 248 to the opening part of recess 242 in the Z direction is 0.2 mm. In addition, the angle of the tilted surface of opening-closing part 248 with respect to the bottom surface of recess 242 is, for example, 45°.

As illustrated in FIG. 7A and FIG. 9A, gap 249 is formed in a cross shape with two linear slits orthogonal to each other. Gap 249 also opens at recess 251 described later. That is, gap 249 communicates between recess 242 and recess 251. The width of gap 249 in the XY plane is large at a center portion of the cross shape, and gradually decreases toward end portions thereof from the center portion. The length of the linear slit is, for example, 4.9 mm, and the width of the center portion of the slit (the maximum width of gap 249) is, for example, 0.3 mm. In addition, the angle (0 in FIG. 7A) defined by both end edges from one end to the center portion of the slit is, for example, 5.0 to 15.0°.

As illustrated in FIG. 5A and FIG. 9A, emitter main body 200 further includes linear protrusion 254 and recesses 251, 252 and 253 formed on second surface 202.

As illustrated in FIG. 9A, each of recesses 251, 252 and 253 is a recess formed on second surface 202. In plan view, recess 251 has a circular shape, and gap 249 opens at the bottom of recess 251. In plan view, recess 252 has a rectangular shape, and linear protrusion 254 is disposed on the bottom of recess 252. Recess 253 is a recess which connects recess 251 and recess 252, and is shallower than the recesses. In the Y direction, recess 253 has a length smaller than the length of recess 252.

As illustrated in FIG. 9A, linear protrusion 254 is a slender linear protrusion extending along the Y direction. In plan view, linear protrusion 254 has a rectangular shape, and the length of linear protrusion 254 in the Y direction is smaller than the length of recess 252 in the Y direction and is substantially equal to the length of recess 253 in the Y direction. In the X direction, linear protrusion 254 is disposed at a position near recess 253 but is separated from recess 253. Thus, as viewed from recess 252 side along the X direction, linear protrusion 254 is disposed at a position where linear protrusion 254 overlaps recess 253.

As illustrated in FIG. 7A and FIG. 9A, film 300 is disposed integrally with emitter main body 200 through hinge part 301. Hinge part 301 is disposed at an edge of first surface 201 of emitter main body 200 in the Y direction. For example, hinge part 301 is a portion having a thickness equal to that of film 300 and a width of 0.5 mm, and is formed integrally with emitter main body 200 and film 300.

As illustrated in FIG. 7A and FIG. 9A, film 300 further includes rectangular opening part 302 at a position corresponding to first recess 211 in the state where film 300 covers first surface 201. For example, the thickness of film 300 may be determined by a computer simulation or an experiment using a trial product or the like on the basis of the deformation amount under a pressure described later, and may be, for example, 0.15 mm.

Each of emitter main body 200 and film 300 is molded with one material having flexibility such as polypropylene, for example. Examples of the material include resin and rubber, and examples of the resin include polyethylene and silicone. The flexibility of emitter main body 200 and film 300 can be adjusted with use of elastic resin materials, and for example, can be adjusted by the type of an elastic resin, the mixing ratio of an elastic resin material to a hard resin material, and the like. Emitter 120 can be manufactured as an integrally molded member by injection molding, for example.

(Operation)

Film 300 turns about hinge part 301, and is closely joined on first surface 201 of emitter main body 200. For example, the joining is performed by welding of a resin material of emitter main body 200 or film 300, by bonding using an adhesive agent, by pressure bonding of film 300 to emitter main body 200 or the like.

As illustrated in FIG. 2A and FIG. 4A, when film 300 is joined to first surface 201, intake channel 221 and recess 212 are sealed with film 300, and the gap between linear protrusions 214 opens at recess 211 and constitutes a plurality of channels connected with intake channel 221. Thus, when film 300 is joined to first surface 201, intake channel 221 and the gap constitute an intake part for receiving the irrigation liquid in tube 110.

In addition, when film 300 is joined to first surface 201, groove 241 and recess 242 are sealed with film 300 as illustrated in FIG. 4A and FIG. 4B. The gap between recess 242 and film 300 serves as a channel for irrigation liquid. The bottom of recess 242 has flexibility of the material of emitter main body 200. When film 300 is joined to first surface 201, recess 242, opening-closing part 248 and gap 249 constitute a flow rate controlling part for controlling the flow rate of the irrigation liquid supplied from a pressure reduction channel described later in accordance with the flow rate of the irrigation liquid supplied from the pressure reduction channel.

At the bottom of recess 242 which constitutes a part of a channel on the downstream side relative to the pressure reduction channel of irrigation liquid, gap 249 opens in a form of two lines intersecting each other, and is connected with a discharging part described later. Opening-closing parts 248 are disposed with gap 249 therebetween, and are composed of right angle triangular pyramid-like parts uprightly provided in the Z direction in recess 242. That is, opening-closing part 248 includes free ends facing gap 249 and a linear fixed end connecting the both ends of gap 249, and, includes a movable part having flexibility and a protrusion protruding from the movable part along the free end toward the channel (recess 242) on the downstream side.

Second surface 202 is joined to the inner wall surface of tube 110. This joining is performed by welding of the resin material of emitter main body 200 or tube 110, by bonding using adhesive agent, by pressure bonding of emitter main body 200 to tube 110, or the like.

When second surface 202 is joined to the inner wall surface of tube 110, second surface 202 makes close contact with tube 110, and intake channel 221 and grooves 231 to 233 are sealed with tube 110. When grooves 231 to 233 is sealed with tube 110, grooves 231 to 233 and hole 234 constitute a channel through which the irrigation liquid received from the intake part flows. Among them, groove 232 constitutes as a pressure reduction channel for allowing the irrigation liquid to flow therethrough while reducing the pressure of the irrigation liquid.

In addition, when second surface 202 is joined to the inner wall surface of tube 110, recesses 251, 252 and 253 are sealed with tube 110. Discharge port 130 is disposed at a position where tube 110 seals recess 252. In this manner, when second surface 202 is joined to tube 110, recess 252 constitutes as a discharge part to which the irrigation liquid having a flow rate controlled by the flow rate controlling part is supplied and which is configured to face discharge port 130.

Normally, emitter 120 is joined to the inner periphery wall of tube 110 before discharge port 130 is formed, and thereafter, discharge port 130 is formed at a position corresponding to a discharge part (recess 252) of tube 110. Alternatively, emitter 120 may be joined to the inner wall surface of tube 110 such that emitter 120 is located at the position of preliminarily provided discharge port 130.

Figure 10A:
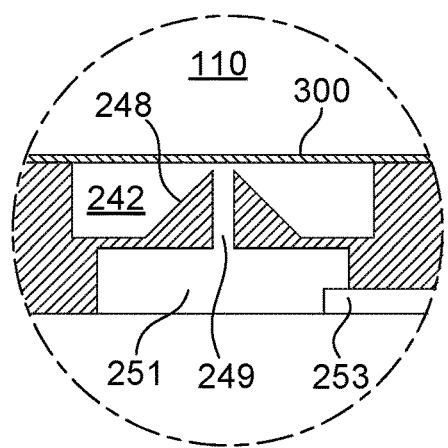
FIG. 10A illustrates part A of FIG. 4B in an enlarged manner in the case where the pressure of the irrigation liquid in the tube is equal to or higher than a first pressure value and lower than a second pressure value.
Figure 10B:
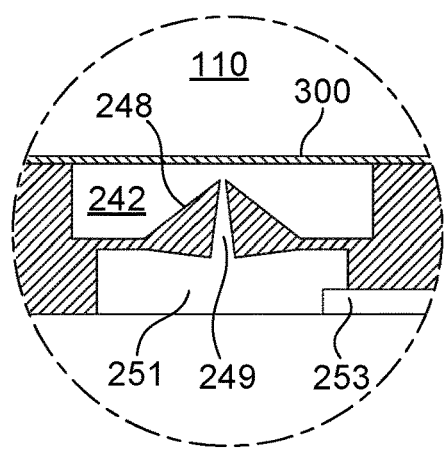
FIG. 10B illustrates part A of FIG. 4B in an enlarged manner in the case where the pressure of the irrigation liquid in the tube is equal to or higher than the second pressure value and lower than the third pressure value.
Figure 10C:
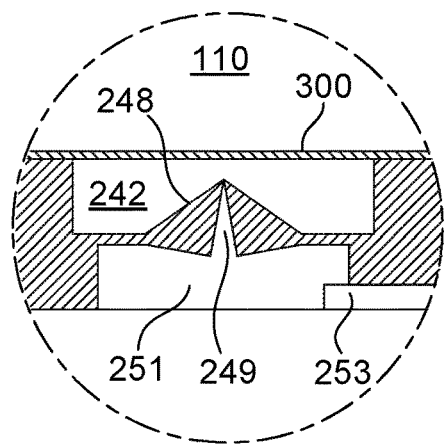
FIG. 10C illustrates part A of FIG. 4B in an enlarged manner in the case where the pressure of the irrigation liquid in the tube is equal to or higher than the third pressure value.

Next, discharge of irrigation liquid by emitter 120 is described. FIG. 10A illustrates part A of FIG. 4B in an enlarged manner in the case where the pressure of the irrigation liquid in tube 110 is equal to or higher than a first pressure value and lower than a second pressure value, FIG. 10B illustrates part A of FIG. 4B in an enlarged manner in the case where the pressure of the irrigation liquid in tube 110 is equal to or higher than the second pressure value and lower than the third pressure value, and FIG. 10C illustrates part A of FIG. 4B in an enlarged manner in the case where the pressure of the irrigation liquid in tube 110 is equal to or higher than the third pressure value.

Supply of irrigation liquid to trickle irrigation tube 100 is performed in a range where the pressure of the irrigation liquid do not exceed 0.1 MPa in view of preventing damaging of tube 110 and emitter 120, for example. When the irrigation liquid is supplied into tube 110, the irrigation liquid reaches recess 212 covered with film 300 through the gap between recess 211 and linear protrusion 213, and reaches intake channel 221 through the gap between recess 212 and linear protrusion 214. Recess 211 and linear protrusion 213, and recess 212 and linear protrusion 214 constitute a channel for the irrigation liquid and prevent intrusion of floating materials in the irrigation liquid larger than the gap between the linear protrusions. Thus, recesses 211 and 212 and linear protrusions 213 and 214 function as a filter.

When the pressure of the irrigation liquid in tube 110 is equal to or higher than the first pressure value (for example, 0.005 MPa), flow rate regulation valve 223 is pushed to second surface 202 side, and the slit of flow rate regulation valve 223 is expanded. In this manner, the irrigation liquid reaching intake channel 221 is received into emitter main body 200 from intake channel 221. Flow rate regulation valve 223 suppresses inflow of the irrigation liquid to emitter main body 200 when the pressure value of the irrigation liquid is lower than the first pressure. Thus, high-pressure supply of the irrigation liquid to tube 110 can be achieved, and therefore the configuration in which emitter 120 has flow rate regulation valve 223 is favorable for forming trickle irrigation tube 100 having a greater length, for example.

The irrigation liquid received from intake channel 221 is supplied to groove 232 (pressure reduction channel) through groove 231. The pressure of the irrigation liquid flowing through groove 232 is reduced as a result of pressure loss caused by the shape (zigzag shape) in plan view of groove 232. In addition, floating materials in the irrigation liquid are entangled in the turbulent flow generated between the protrusions of groove 232 and are retained in groove 232. In this manner, the floating materials are further removed from the irrigation liquid by pressure reduction channel 230.

In addition, since the tip of the protrusion is disposed in such a manner that the tip does not exceed the center line of groove 232 in plan view, a space which is not blocked by the protrusion is formed at the center of groove 232 while the width of the space is small, and thus the irrigation liquid easily flow through groove 232. Accordingly, in addition to the effect of reducing pressure and the effect of removing the floating material, groove 232 is favorable for allowing irrigation liquid to flow with a greater flow rate.

The irrigation liquid having passed through groove 232 in which the pressure is reduced and the floating materials are removed is supplied to recess 242 through groove 233, hole 234, and groove 241. As illustrated in FIG. 10A, the gap between film 300 and recess 242 is filled with the irrigation liquid, and the irrigation liquid reaches recess 251 through gap 249 between opening-closing parts 248.

The irrigation liquid having reached recess 251 reaches recess 252 through recess 253 and is then discharged out of tube 110 through discharge port 130 which faces recess 252 and opens at recess 252.

It is to be noted that foreign matters such as soil may intrude into recess 252 from discharge port 130, intrusion of such foreign matters into gap 249 is blocked by linear protrusion 254 disposed in recess 252.

As the pressure of the irrigation liquid in tube 110 increases, the flow rate of the irrigation liquid received into emitter main body 200 from intake channel 221 increases, and the discharge rate of the irrigation liquid from discharge port 130 increases.

When the pressure of the irrigation liquid in tube 110 is equal to or higher than the second pressure value (for example 0.02 MPa), the pressure of the irrigation liquid in recess 242 increases, and opening-closing part 248 is pushed by the irrigation liquid in recess 242 as illustrated in FIG. 10B. As a result, the bottom side part of the tilted surface of opening-closing part 248 bends (with the bottom side part as a fixed end) and opening-closing parts 248 are brought closer to each other, thus reducing gap 249. For example, the maximum width of gap 249 is changed to 0.15 mm Consequently, the area of the channel of gap 249 for irrigation liquid and the amount of the irrigation liquid passing through gap 249 are reduced, and thus increase of the discharge rate of the irrigation liquid from discharge port 130 is suppressed.

When the pressure of the irrigation liquid in tube 110 is equal to or higher than a third pressure value (for example 0.05 MPa), the pressure of the irrigation liquid in recess 242 further increases, and, as illustrated in FIG. 10C, opening-closing part 248 is further pushed by the irrigation liquid in recess 242, and tip end portions of opening-closing part 248 make close contact with each other while gap 249 still remain on the fixed end side between opening-closing parts 248. Thus, gap 249 is reduced to a minimum size. The irrigation liquid in recess 242 is supplied to recess 251 through gap 249 having the minimum size. Consequently, the amount of the irrigation liquid which passes through the flow rate controlling part is restricted to a flow rate which can pass through gap 249 having the minimum size, and the discharge rate of the irrigation liquid from discharge port 130 becomes substantially constant. In this manner, emitter 120 quantitatively discharges the irrigation liquid from tube 110 supplied with the irrigation liquid.

When the pressure of the irrigation liquid in tube 110 is returned to the second pressure value, opening-closing part 248 is returned to the state illustrated in FIG. 10B, and when the pressure of the irrigation liquid in tube 110 is returned to the first pressure value, opening-closing part 248 is returned to the state illustrated in FIG. 10A. In this manner, in emitter 120, the amount of the irrigation liquid passing through gap 249 is controlled in accordance with the pressure of the irrigation liquid of recess 242. As described above, the pressure of the irrigation liquid in recess 242 varies in accordance with the pressure of the irrigation liquid in tube 110. Thus, according to emitter 120, the discharge rate of the irrigation liquid is controlled in accordance with the pressure of the irrigation liquid in tube 110.

(Effect)

As described, emitter 120 is an emitter to be disposed on a tube 110 for allowing irrigation liquid to flow therethrough, emitter 120 being configured for quantitatively discharging the irrigation liquid in tube 110 to outside of tube 110, emitter 120 comprising: the intake part for receiving the irrigation liquid in tube 110; the pressure reduction channel for allowing the irrigation liquid received from the intake part to flow therethrough while reducing a pressure of the irrigation liquid; the flow rate controlling part for controlling a flow rate of the irrigation liquid supplied from the pressure reduction channel in accordance with a pressure of the irrigation liquid supplied from the pressure reduction channel; and, the discharging part configured to be supplied with the irrigation liquid which is to be discharged to the outside of tube 110 and has a flow rate controlled by the flow rate controlling part. The flow rate controlling part includes gap 249 opening in a linear shape at recess 242 which is a channel on a downstream side of the pressure reduction channel and communicated with the discharging part, a movable part having flexibility and including a free end facing gap 249 and a fixed end, the fixed end having a straight line shape and connecting both ends of gap 249, and a protrusion protruding along the free end from the movable part toward recess 242; and, when the pressure of the irrigation liquid in the channel is equal to or higher than a predetermined value, the movable part bends and the protrusion reduces a channel area of a channel of the irrigation liquid constituted by gap 249. Accordingly, emitter 120 controls the discharge rate of the irrigation liquid in accordance with the pressure of the irrigation liquid in the channel on the downstream side which varies depending on the pressure of the irrigation liquid in tube 110, and thus can stabilize the discharge rate of the irrigation liquid. Further, emitter 120 can be constituted with two injection-molded articles at most, or with one injection-molded article at least. Therefore, emitter 120 can further reduce manufacturing cost in comparison with conventional emitters composed of three parts.

In addition, emitter 120 is an emitter for quantitatively discharging the irrigation liquid in tube 110 from discharge port 130, emitter 120 being configured to be joined to an inner wall surface of tube 110 at a position corresponding to the discharge port 130 configured to communicate between inside and outside of tube 110; the flow rate controlling part includes: recess 242 for constituting a part of a channel of the irrigation liquid on a downstream side of the pressure reduction channel in emitter 120, recess 242 opening at a surface of emitter 120 at a position (first surface 201) where the surface of emitter 120 is not joined to the inner wall surface; and lid part (film 300) configured to seal the opening part and block communication between the channel on the downstream side of the pressure reduction channel and the inside of tube 110; recess 242 has a bottom having flexibility; and gap 249 opens at the bottom of recess 242. This configuration is further effective from the viewpoint of constituting an emitter which can achieve the above-mentioned effects and which is to be disposed inside tube 110.

In addition, the protrusion has a shape like a triangular pyramid cut out from a polygonal pyramid along adjacent two sides of the polygonal pyramid which connect a tip end point and a bottom surface of the polygonal pyramid, and one of bottom sides of the triangular pyramid which is common to a bottom side of the polygonal pyramid is the fixed end, and each of remaining two sides is the free end. This configuration makes it possible to constitute the flow rate controlling part which operates in the above-mentioned manner by injection molding with one component, and therefore the configuration is further effective from the standpoint of reducing the manufacturing cost.

In addition, with the configuration in which the intake part further includes flow rate regulation valve 223 for expanding the channel for the irrigation liquid when the pressure of the irrigation liquid in tube 110 is equal to or higher than a predetermined value, the irrigation liquid can be supplied to tube 110 with a higher pressure, and therefore the configuration is favorable from the standpoint of forming trickle irrigation tube 100 having a greater length.

In addition, with the configuration in which emitter 120 is molded with one material having flexibility and film 300 is integrally molded as a part of emitter 120, emitter 120 can be produced as one component by injection molding, and therefore the configuration is further effective from the standpoint of reducing manufacturing cost.

In addition, since opening-closing part 248 is formed in a right angle triangular pyramid-like shape, the boundary between opening-closing part 248 and the bottom of recess 242 is a base end edge of opening part 248 in the tilted surface, and has a straight line shape. Consequently, since the configuration in which the boundary between opening-closing part 248 and the bottom surface of recess 242 is a straight line is favorable for performing the opening and closing of the protrusion (opening-closing part 248) with a smaller force, the configuration is further effective from the viewpoint of precisely setting a predetermined discharge rate of the irrigation liquid in emitter 120.

When emitter 120 is joined to the inner wall surface of tube 110, trickle irrigation tube 100 including tube 110 and emitter 120 disposed to tube 110 is provided. Trickle irrigation tube 100 can discharge irrigation liquid at a desired discharge rate. Accordingly, trickle irrigation tube 100 is favorably used for growing plants.

(Modification)

In trickle irrigation tube 100, the above-described configurations may be partially changed, or other configurations may be additionally provided as long as the above-described effect is achieved.

For example, tube 110 may be a seamless tube, or a tube composed of slender sheet(s) joined together along the longitudinal direction.

In addition, discharge port 130 may be a gap formed at the above-mentioned joining part of the sheets so as to communicate between the inside and the outside of tube 110, or a pipe sandwiched by the sheets at the joining part. Further, the shape of the discharge port in an axial direction thereof may not be a straight line shape. Examples of the tube having the discharge port include a tube in which a depression having a desired shape and serving as a channel is formed on the surface of the above-mentioned sheet, and a discharge port composed of the channel is formed at the joining part when the sheets are joined together.

While intake channel 221 of emitter 120 is located at a position on the upstream side in the flow direction of the irrigation liquid in tube 110, intake channel 221 may be located at a position on the downstream side. In addition, the orientations of a plurality of emitters 120 in one tube 110 may be identical to one another or different from one another.

In addition, the resin material of emitter main body 200 and the resin material of film 300 may be identical to each other or different from each other.

While emitter main body 200 is integrally molded by injection molding of resin, emitter main body 200 may be composed of two components of a first surface 201 side component and a second surface 202 side component. In this case, the components on the first surface 201 side are molded integrally with film 300. With the configuration in which emitter main body 200 is composed of the two components, the pressure reduction channel can be disposed inside emitter main body 200, for example. Further, the two components may be integrally molded through a hinge part.

In addition, the channel connecting intake channel 221 and recess 242 which include the pressure reduction channel may be composed of a groove on first surface 201 covered with film 300 in emitter main body 200.

In addition, second surface 202 may be a curved surface extending along the inner wall of tube 110 (for example, a surface defined by the arc whose arc radius is the internal diameter of tube 110 in the YZ plane).

Further, since it suffices to appropriately dispose flow rate regulation valve 223 in accordance with the pressure of the irrigation liquid supplied to tube 110, emitter 120 may not be provided with flow rate regulation valve 223.

While emitter 120 preferably include a pressure reduction channel having the above-mentioned shape from the viewpoint of ensuring a predetermined discharge rate, emitter 120 may not be provided with the pressure reduction channel. For example, while opening-closing part 248 operates with the pressure of the irrigation liquid in recess 242, the pressure reduction channel may not have the above-described shape (for example, may be a simple linear channel) as long as the channel from the intake part to the flow rate regulation part is a channel which generates the above-mentioned pressure for achieving a desired operation of opening-closing part 248.

In addition, flow rate control valve 244 may have polygonal shapes other than a square in plan view. For example, flow rate control valve 244 may have a triangular shape, or a hexagonal shape in plan view. Flow rate control valve 244 having a plan shape with a small number of angles is favorable for facilitating the contact between opening-closing parts 248 which operate with a high pressure, and flow rate control valve 244 having a plan shape with a large number of angles is favorable for increasing the difference of the flow rate of the irrigation liquid by the operation of opening-closing part 248.

Figure 21A:
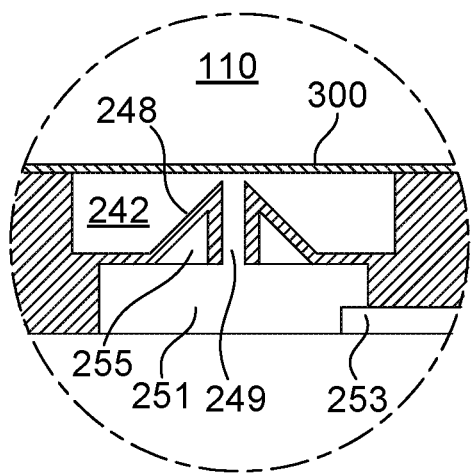
FIG. 21A is a sectional view schematically illustrating a first modification of a protrusion of the first and second embodiments of the present invention.
Figure 21B:
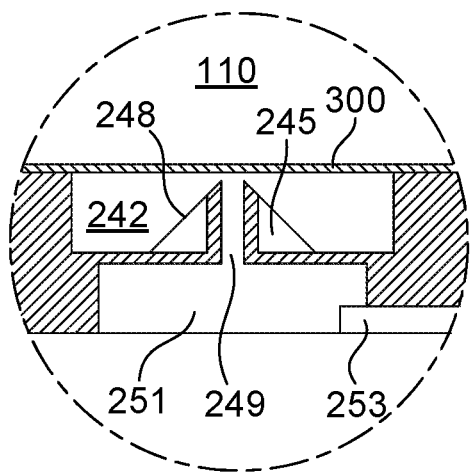
FIG. 21B is a sectional view schematically illustrating a second modification of the protrusion.

In addition, opening-closing part 248 may not be a triangular pyramid-like member as long as opening-closing part 248 operates with the pressure of the irrigation liquid in recess 242 in the above-mentioned manner. For example, as illustrated in FIG. 21A, opening-closing part 248 may include hollow part 255 which opens at the bottom surface of the triangular pyramid-like member (to recess 251 side), or, as illustrated in FIG. 21B, may include a hollow part 245 which opens at the tilted surface of the triangular pyramid-like member (to recess 242 side). The configuration in which opening-closing part 248 is provided with the above-mentioned hollow part is favorable for constituting opening-closing part 248 with a molded article having a constant thickness, and therefore the configuration is further effective from the viewpoint of increasing the productivity of emitter 120 by injection molding.

In addition, one or a plurality of opening-closing parts 248 may be provided. For example, it is possible to adopt a configuration in which only a part of opening-closing parts 248 having a structure of a polygonal pyramid body divided with gap 249 is movable and the remaining parts are integrally provided such that gap 249 is not formed. Alternatively, it is possible to adopt a configuration in which only a part of opening-closing parts 248 is movable, and the remaining parts are fixed to each other with gap 249 therebetween. The opening and closing of opening-closing part 248 can be further readily designed with the configuration in which the number of movable opening-closing parts 248 is small, and the configuration in which the number of movable opening-closing part 248 is large is favorable for increasing the difference of the flow rate of the irrigation liquid by the operation of opening-closing part 248. It is to be noted that, when only one opening-closing part 248 is movable, the opening shape of gap 249 may be a V-shape composed of two linear slits intersecting each other. In addition, gap 249 may not be linear. In this manner, the opening shape of gap 249 may be a folded shape or a curved shape which sections opening-closing part 248.

Embodiment 2

Now Embodiment 2 of the present invention is described.
(Configuration)

Figure 11:
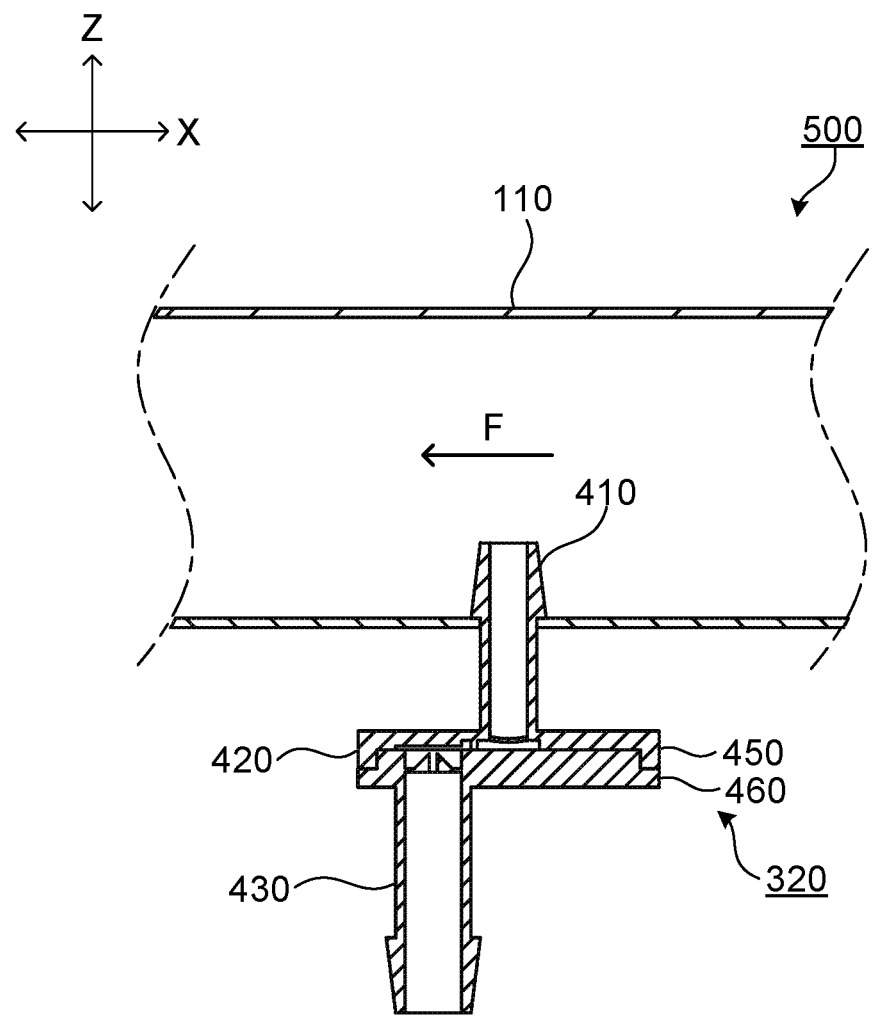
FIG. 11 is a schematic sectional view of a trickle irrigation tube according to a second embodiment of the present invention.

FIG. 11 is a schematic sectional view of trickle irrigation tube 500 according to Embodiment 2 of the present invention. Trickle irrigation tube 500 is composed of tube 110 and emitter 320. The configuration of tube 110 is identical to that of the above-described Embodiment 1. The configuration of tube 110 is identical to that of the above-described Embodiment 1.

Figure 12A:
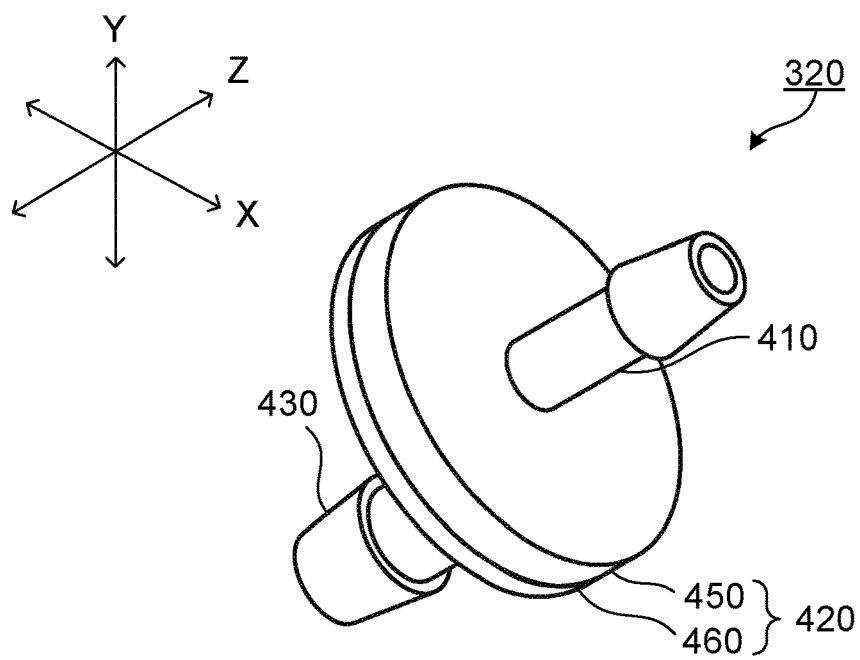
FIG. 12A is a perspective view of the emitter according to the embodiment as viewed from the tube side.
Figure 12B:
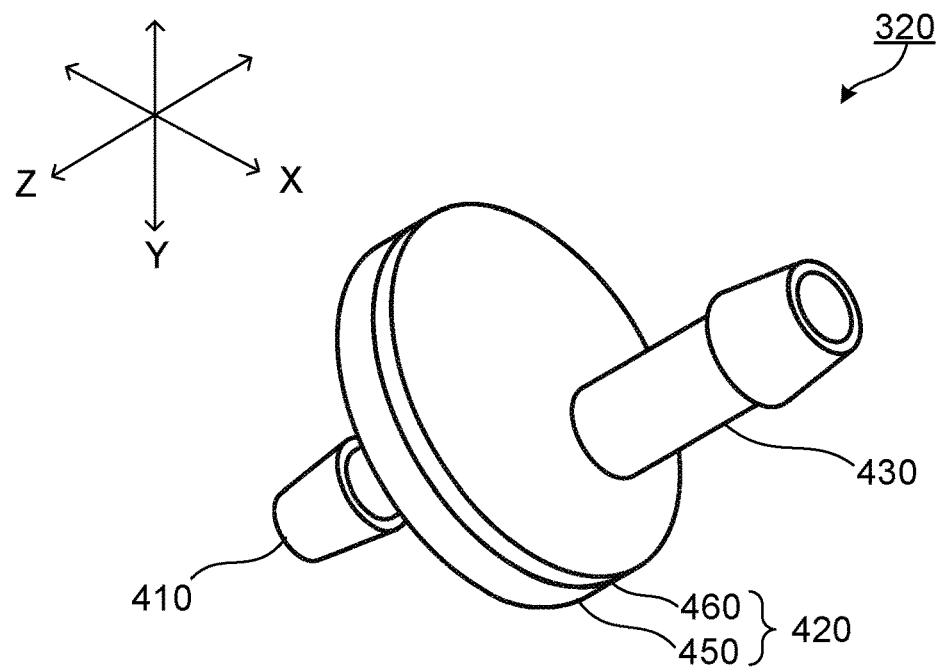
FIG. 12B is a perspective view of the emitter as viewed from a side opposite to the tube.
Figure 13A:
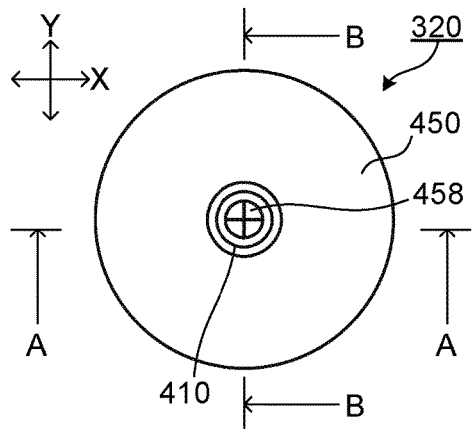
FIG. 13A is a plan view of the emitter according to the embodiment.
Figure 13C:
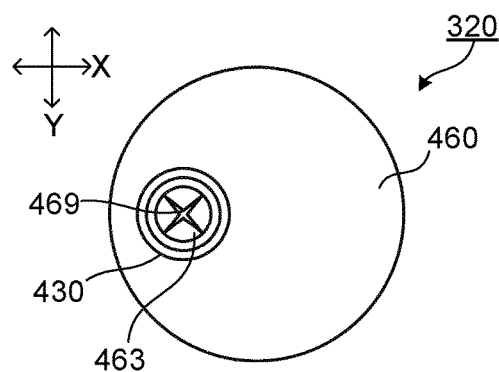
FIG. 13C is a bottom view of the emitter.
Figure 13B:
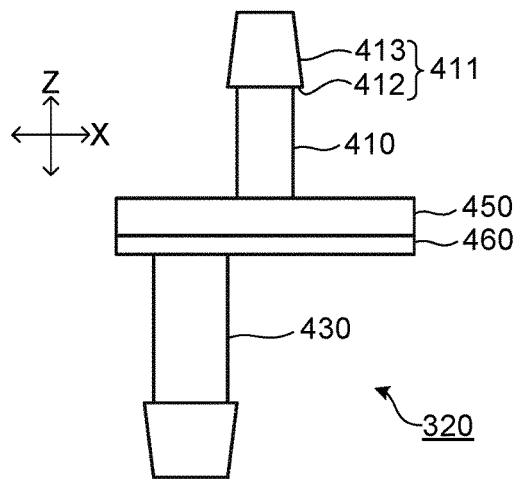
FIG. 13B is a front view of the emitter.
Figure 13D:
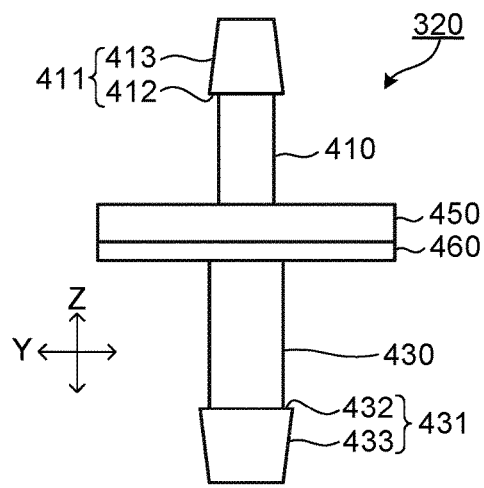
FIG. 13D is a side view of the emitter.

FIG. 12A is a perspective view of emitter 320 in FIG. 1 as viewed from tube 110 side, and FIG. 12B is a perspective view of emitter 320 in FIG. 1 as viewed from a side opposite to tube 110. FIG. 13A is a plan view of emitter 320, FIG. 13B is a front view of emitter 320, FIG. 13C is a bottom view of emitter 320, and FIG. 13D is a side view of emitter 320. In addition, FIG. 14A is a sectional view of emitter 320 taken along line A-A of FIG. 13A, and FIG. 14B is a sectional view of emitter 320 taken along line B-B of FIG. 13A.

Emitter 320 includes first cylindrical part 410, flange part 420 connected with first cylindrical part 410, and second cylindrical part 430 connected with flange part 420 on a side opposite to first cylindrical part 410 side. Flange part 420 is composed of a combination of first plate part 450 and second plate part 460. It is to be noted that the Z direction is a direction along the axis of first cylindrical part 410, and includes the direction along which emitter 320 is inserted to tube 110. The X direction is one direction orthogonal to the Z direction, and the Y direction is a direction orthogonal to both of the Z direction and the X direction.

As illustrated in FIG. 12A, first cylindrical part 410 is a cylindrical member uprightly provided on the surface of first plate part 450. As illustrated in FIG. 13A and FIG. 13B, first cylindrical part 410 is disposed at a center portion of flange part 420 in plan view.

Figure 14A:
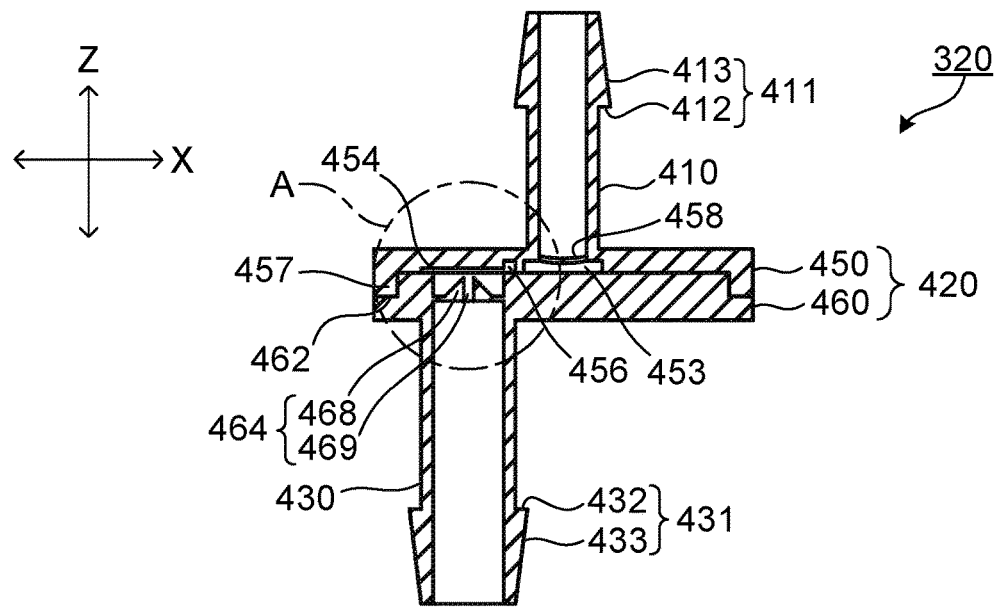
FIG. 14A is a sectional view of the emitter according to the embodiment taken along line A-A of FIG. 13A.
Figure 14B:
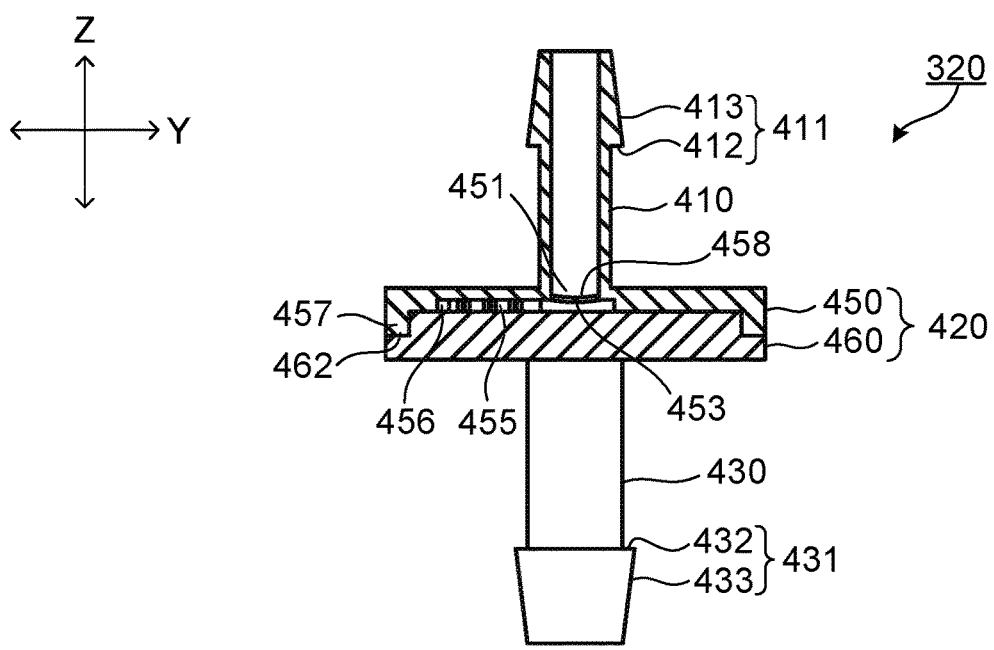
FIG. 14B is a sectional view of the emitter taken along line B-B of FIG. 13A.

As illustrated in FIG. 14A, barb 411 is formed at a tip end portion of first cylindrical part 410. Barb 411 is composed of large diameter part 412 which expands from the outer peripheral surface of first cylindrical part 410 along XY plane, and tapered surface 413 whose outer diameter gradually decreases from large diameter part 412 toward the tip end of first cylindrical part 410. For example, first cylindrical part 410 has an internal diameter of 2 mm, large diameter part 412 has an outer diameter of 3.2 mm, an end of tapered surface 413 has an outer diameter of 2.6 mm, and first cylindrical part 410 has a height from the surface of flange part 420 of 5 mm.

As viewed along the Z direction (as the shape in plan view), flange part 420 has a circular shape. For example, flange part 420 has a thickness of 3 mm, and flange part 420 has an outer diameter of 16 mm.

As illustrated in FIG. 12B, second cylindrical part 430 is a cylindrical member uprightly provided on the second surface of second plate part 460. As illustrated in FIG. 13B and FIG. 13C, second cylindrical part 430 is disposed at a position shifted from the center of flange part 420 in the X direction in plan view on a side opposite to first cylindrical part 410. As illustrated in FIG. 14A, second cylindrical part 430 includes an opening of recess 463 described later on the second surface. That is, second cylindrical part 430 is communicated with recess 463. The internal diameter of second cylindrical part 430 is equal to the diameter of recess 463.

As illustrated in FIG. 14A and FIG. 14B, barb 431 is formed at an end portion of second cylindrical part 430 as with first cylindrical part 410. Barb 431 is composed of large diameter part 432 which expands from the outer peripheral surface of second cylindrical part 430 along the XY plane, and tapered surface 433 whose outer diameter gradually decreases from large diameter part 432 toward an end of second cylindrical part 430. For example, second cylindrical part 430 has an internal diameter of 3 mm, large diameter part 432 has an outer diameter of 5 mm, the end of tapered surface 433 has an outer diameter of 4 mm, and second cylindrical part 430 has a height from the second surface of second plate part 460 of 12 mm.

Figure 15A:
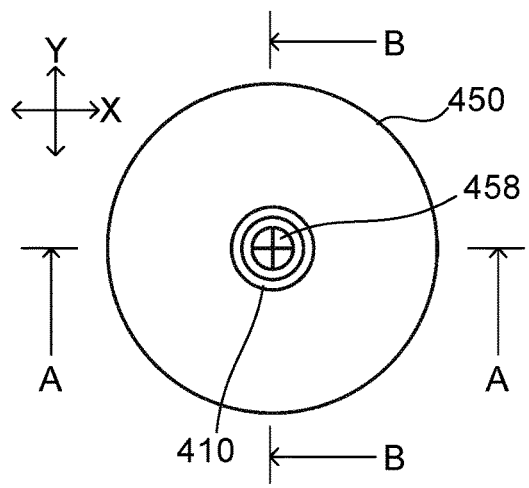
FIG. 15A is a plan view of a first member according to the embodiment.
Figure 15B:
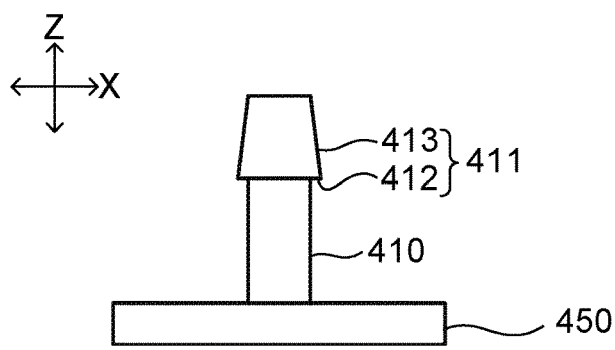
FIG. 15B is a front view of the first member.
Figure 15C:
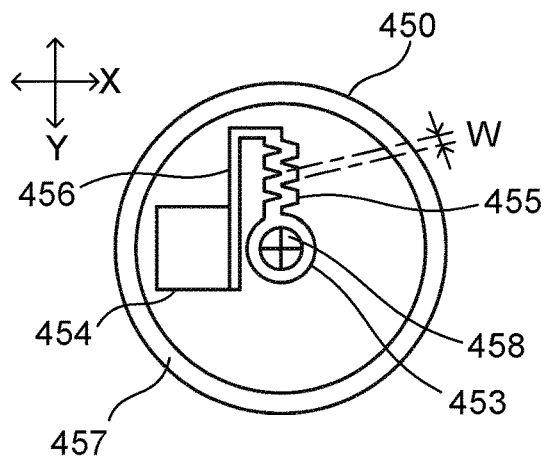
FIG. 15C is a bottom view of the first member.

FIG. 15A is a plan view of an integrally molded article (hereinafter also referred to as "first member") of first cylindrical part 410 and first plate part 450, FIG. 15B is a front view of the first member, and FIG. 15C is a bottom view of the first member. In addition, FIG. 16A is a sectional view of the first component taken along line A-A of FIG. 15A, and FIG. 16B is a sectional view of the first component taken along line B-B of FIG. 15A.

Figure 16A:
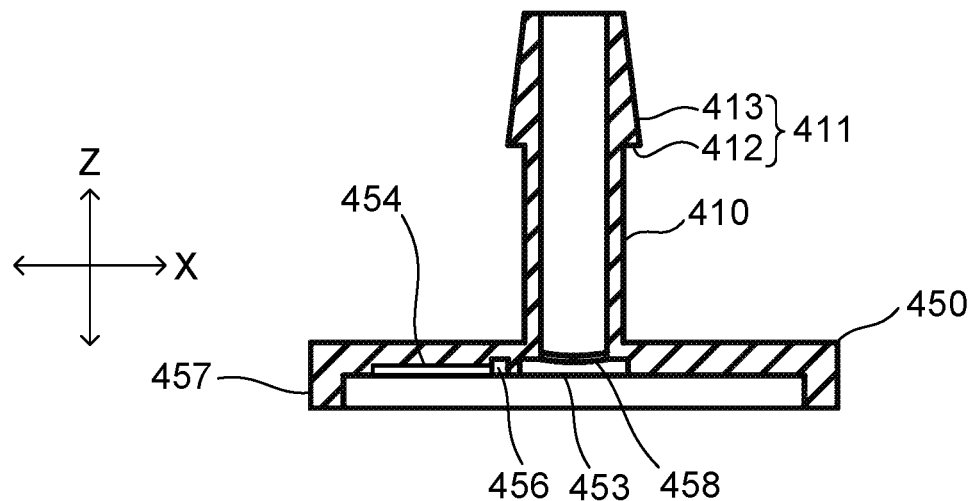
FIG. 16A is a sectional view of the first member according to the embodiment taken along line A-A of FIG. 15A.
Figure 16B:
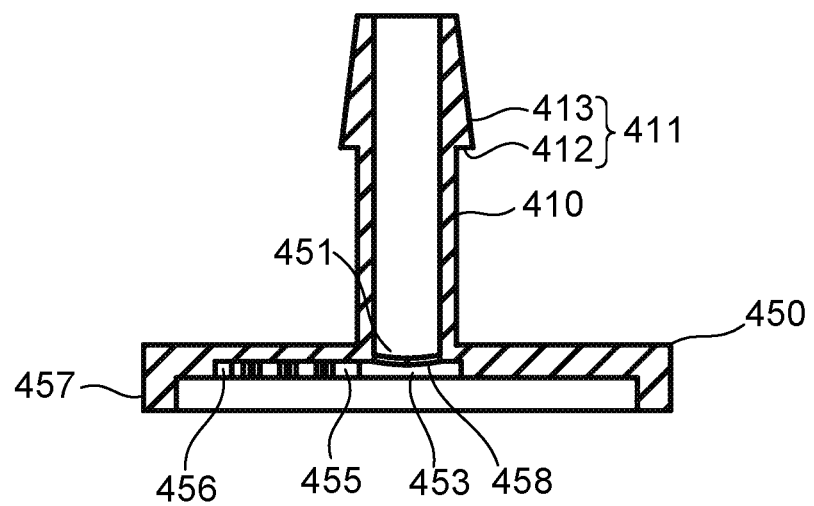
FIG. 16B is a sectional view of the first member taken along line B-B of FIG. 15A.

As illustrated in FIG. 15C, FIG. 16A and FIG. 16B, first plate part 450 includes hole 451 opening at the surface, and recesses 453 and 454, grooves 455 and 456 and linear protrusion 457 formed on the bottom surface. First plate part 450 further includes flow rate regulation valve 458 which covers hole 451 at the boundary part between hole 451 and recess 453.

As illustrated in FIG. 14B and FIG. 16B, hole 451 opens at a center portion of the surface of first plate part 450, and opens at recess 453 described later. In addition, the opening of hole 451 on the surface of first plate part 450 is included in first cylindrical part 410. That is, hole 451 communicates between first cylindrical part 410 and recess 453. In plan view, hole 451 has a circular shape as illustrated in FIG. 13A. The diameter of hole 451 is equal to the internal diameter of first cylindrical part 410.

As illustrated in FIG. 16A and FIG. 16B, recess 453 is a recess formed at a center portion of the bottom surface of first plate part 450. In plan view, recess 453 has a circular shape as illustrated in FIG. 15C. The diameter of recess 453 is slightly greater than the internal diameter of first cylindrical part 410. Recess 453 has a depth from the bottom surface of first plate part 450 of, for example, 0.5 mm.

As illustrated in FIG. 15C, groove 455 is a groove formed on the bottom surface of first plate part 450 and connected with recess 453. As illustrated in FIG. 15C, groove 455 extends along the radial direction on the bottom surface of first plate part 450 from recess 453 to a peripheral portion of the bottom surface of first plate part 450. In plan view, groove 455 has a zigzag shape similar to that of the groove 232, and groove 455 has a width (in FIG. 15C W) of, for example, 0.45 mm.

As illustrated in FIG. 15C, recess 454 is a recess formed independently from recess 453 on the bottom surface of first plate part 450 at a position adjacent to recess 453 in the X direction. In plan view, recess 454 has a rectangular shape. Recess 454 has a depth from the bottom surface of first plate part 450 of, for example, 0.2 mm.

As illustrated in FIG. 15C, groove 456 is a groove formed on the bottom surface of first plate part 450, and connects groove 455 and recess 454. In plan view, groove 456 has an L shape, and groove 456 is connected with groove 455 at an end of the short side of the L-shape and with recess 454 at an end portion of the long side of the L-shape.

As illustrated in FIG. 15C, linear protrusion 457 is disposed at a peripheral portion of the bottom surface of first plate part 450, and as illustrated in FIG. 16, linear protrusion 457 protrudes from the bottom surface of first plate part 450. In plan view, linear protrusion 457 has a ring shape as illustrated in FIG. 15C. Linear protrusion 457 has a height from the bottom surface of first plate part 450 of, for example, 1 mm.

As with the above-described flow rate regulation valve 223, flow rate regulation valve 458 is composed of four opening-closing parts. As illustrated in FIG. 16A and FIG. 16B, the opening-closing part has a form similar to the form in which a substantially hemisphere thin dome covering the opening of recess 453 side of hole 451 and protruding toward recess 453 is divided with slits in a cross shape. The slit has a width of, for example, 0 mm, and the opening-closing part has a thickness of, for example, 0.2 mm.

Figure 17A:
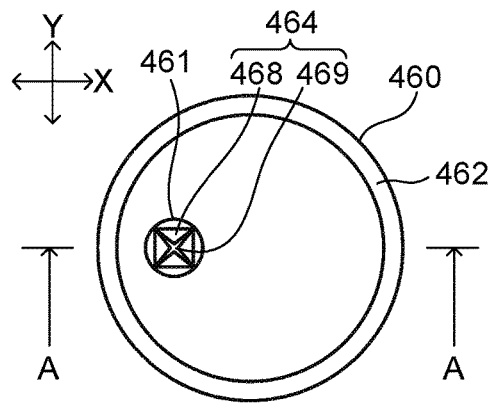
FIG. 17A is a plan view of a second member according to the embodiment.
Figure 17B:
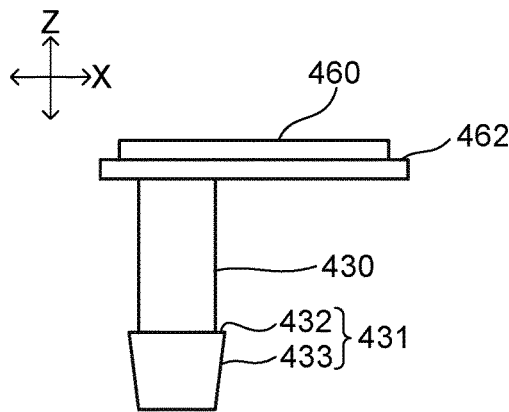
FIG. 17B is a front view of the second member.
Figure 17D:
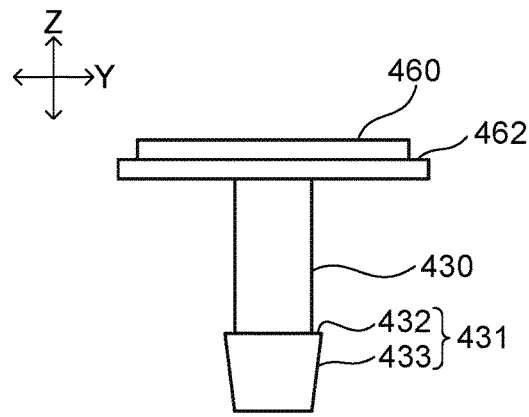
FIG. 17D is a side view of the second member.
Figure 17C:
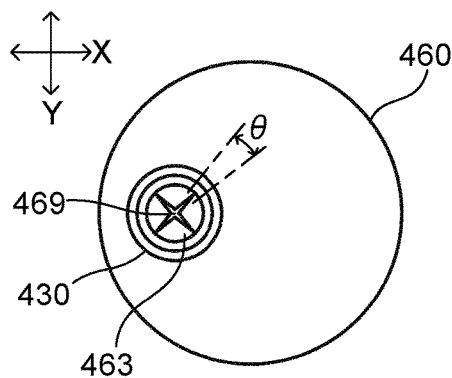
FIG. 17C is a bottom view of the second member.

FIG. 17A is a plan view of an integrally formed member (hereinafter also referred to as "second member") of second cylindrical part 430 and second plate part 460, FIG. 17B is a front view of the second member, FIG. 17C is a bottom view of the second member, and FIG. 17D is a side view of the second member. In addition, FIG. 18 is a sectional view of the second member taken along line A-A of FIG. 17A.

Figure 18:
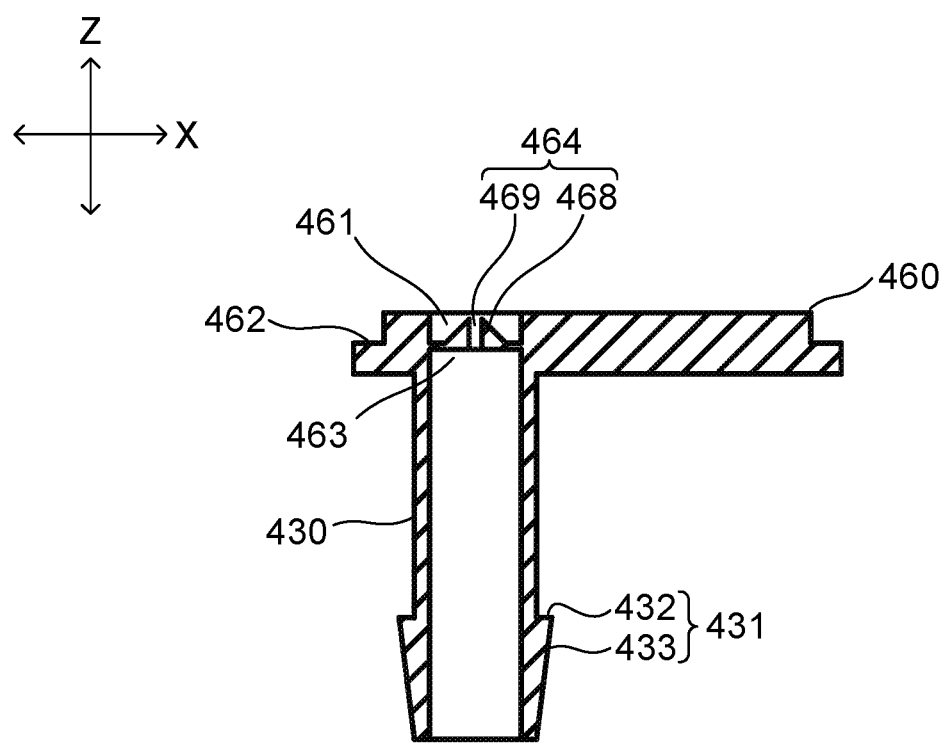
FIG. 18 is a sectional view of the second member according to the embodiment taken along line A-A of FIG. 17A.

As illustrated in FIG. 18, second plate part 460 includes recess 461 and linear recess 462 formed on one surface of (first surface) and recess 463 formed on the other surface (second surface). Recess 461 includes flow rate control valve 464 disposed on the bottom thereof.

As illustrated in FIG. 18, recess 461 is a bottomed recess which opens at the first surface of second plate part 460. In plan view, recess 461 has a circular shape. Recess 463 described later is disposed on a side opposite to recess 461 with second plate part 460 therebetween as illustrated in FIG. 18 and FIG. 17A. The bottom of recess 461 has a thickness of, for example, 0.2 mm.

As illustrated in FIG. 17A and FIG. 18, flow rate control valve 464 has a configuration in which a square pyramid is divided along the sides of the square pyramid with slits in a cross shape into four right angle triangular pyramids. That is, flow rate control valve 464 includes four opening-closing parts 468 and gap 469 formed between each opening-closing parts 248.

As illustrated in FIG. 17A, opening-closing part 468 has a right angle triangular pyramid-like shape whose bottom surface has a rectangular equilateral triangular shape. As illustrated in FIG. 18, in opening-closing part 468, the oblique side of the rectangular equilateral triangle of the bottom is a fixed end, and the remaining two sides thereof orthogonal to each other are free ends. Opening-closing part 468 is composed of the bottom surface, a side surface having a right triangular-like shape, and a tilted surface having an isosceles triangular (regular triangular) shape. The side surface has a shape with the short side of the bottom surface having a rectangular equilateral triangular-like shape, a side orthogonal to the bottom surface, and an oblique side connecting the other two sides. The distance between bottom sides of opposite two opening-closing parts 468 (the distance between fixed ends of opposite two opening-closing parts 468, that is, the length of one side of the square pyramid) is, for example, 2.0 mm. In addition, the height of opening-closing part 468 from the bottom of recess 461 is, for example, 0.8 mm. Further, the distance from the apex of opening-closing part 468 to the opening part of recess 461 in the Z direction is 0.2 mm. In addition, the angle of the tilted surface of opening-closing part 468 with respect to the bottom surface of recess 461 is, for example, 45°.

As illustrated in FIG. 17A, gap 469 is formed in a cross shape with two linear slits orthogonal to each other. Gap 469 also opens at recess 463 described later. That is, gap 469 communicates between recess 463 and recess 251. The width of gap 469 in the XY plane is large at a center portion of the cross shape, and gradually decreases toward end portions thereof from the center portion. The width of the center portion of the slit (the maximum width of gap 469) is, for example, 0.3 mm. In addition, the angle (θ in FIG. 17C) defined by both end edges from one end to the center portion of the slit is, for example, 5.0 to 15.0°.

As illustrated in FIG. 17A, linear recess 462 is disposed at the peripheral portion of the first surface, and is depressed from the second surface as illustrated in FIG. 17B and FIG. 17D. In plan view, linear recess 462 has a ring shape as illustrated in FIG. 17A. Linear recess 462 has a depth from the second surface of, for example, 1 mm.

As illustrated in FIG. 18, recess 463 is disposed at a position where recess 463 overlaps recess 461 in the Z direction in the second surface. As is obvious from FIG. 17C and FIG. 18, recess 463 has a circular shape in plan view. Gap 469 opens at the bottom surface of recess 463.

As with emitter main body 200 of Embodiment 1, each of the first component and the second component is integrally molded by injection molding using one resin material having flexibility (for example, polypropylene). Examples of the material of the first component and the second component include resin and rubber, and examples of the resin include polyethylene and silicone. The flexibility of the material is properly adjusted by the type of the resin material, mixture of two or more resin materials or the like in accordance with the flexibility required for flow rate control valve 464 (opening-closing part 468).

(Operation)

The first member and the second member are combined with each other by fitting linear protrusion 457 of first plate part 450 with linear recess 462 of second plate part 460, and thus emitter 320 is constituted as illustrated in FIG. 12A and FIG. 12B. The bottom surface of first plate part 450 and the first surface of the second plate part may be further bonded by welding of a resin material, by bonding using an adhesive agent, by pressure bonding of one of them to the other or the like.

As illustrated in FIG. 14A and FIG. 14B, when the first member and the second member are combined with each other, grooves 455 and 456 illustrated in FIG. 15C are sealed with the surface of second plate part 460, and thus the channel for irrigation liquid is constituted. In addition, the intake part for receiving the irrigation liquid in tube 110 is composed with first cylindrical part 410, hole 451 and recess 453. Groove 455 constitutes as the pressure reduction channel for allowing the irrigation liquid received from the intake part to flow therethrough while reducing the pressure of the irrigation liquid.

In addition, recess 454 illustrated in FIG. 15C and recess 461 illustrated in FIG. 17A constitute a part of a channel on the downstream side relative to the pressure reduction channel of the irrigation liquid when the first member and the second member are combined with each other. In addition, opening-closing part 468 and gap 469 constitute a flow rate controlling part for controlling the flow rate of the irrigation liquid supplied from the pressure reduction channel in accordance with the pressure of the irrigation liquid supplied from the pressure reduction channel.

In the flow rate controlling part, the bottom of recess 461 has flexibility of the material of the second member. At the bottom of recess 461 which constitutes a part of a channel on the downstream side relative to the pressure reduction channel of irrigation liquid, gap 469 opens in a form of two lines intersecting each other, and is connected with a discharging part described later. Opening-closing parts 468 are disposed with gap 469 therebetween, and are composed of right angle triangular pyramid-like parts uprightly provided in the Z direction in recess 461. That is, opening-closing part 468 includes free ends facing gap 469 and a linear fixed end connecting the both ends of gap 469, and, includes a movable part having flexibility and a protrusion protruding from the movable part along the free end toward the channel (recess 461) on the downstream side.

It is to be noted that second cylindrical part 430 is communicated with recess 461 and constitutes as the discharge part which is supplied with irrigation liquid which is to be discharged out of tube 110 and has a flow rate controlled by the flow rate controlling part.

As illustrated in FIG. 11, emitter 320 is attached to tube 110 by inserting first cylindrical part 410 to the pipe wall of tube 110. Attaching of emitter 320 may be performed by penetrating the pipe wall of tube 110 with first cylindrical part 410, or by inserting first cylindrical part 410 to an opening part for insertion which is preliminarily formed on the pipe wall of tube 110. The former is favorable for arbitrarily disposing emitter 320 on tube 110, and the latter is favorable for preventing leakage of irrigation liquid from tube 110. Since first cylindrical part 410 includes a barb at an end portion thereof, dropping of emitter 320 from tube 110 is prevented.

It is to be noted that second cylindrical part 430 of emitter 320 includes barb 431 as illustrated in FIG. 14A and FIG. 14B. Accordingly, barb 431 can be inserted to a mulching film covering the soil, or barb 431 can be inserted to a fibrous cultivation bed. Insertion of barb 431 to the cultivation bed is favorable for specifying the position of dropping of irrigation liquid to the cultivation bed, and for fixing trickle irrigation tube 500 on the cultivation bed.

Figure 19A:
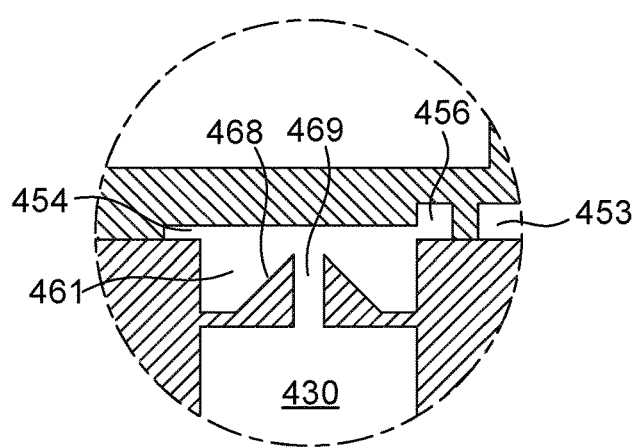
FIG. 19A illustrates part A of FIG. 14A in an enlarged manner in the case where the pressure of the irrigation liquid in the tube is equal to or higher than a first pressure value and lower than a second pressure value.
Figure 19B:
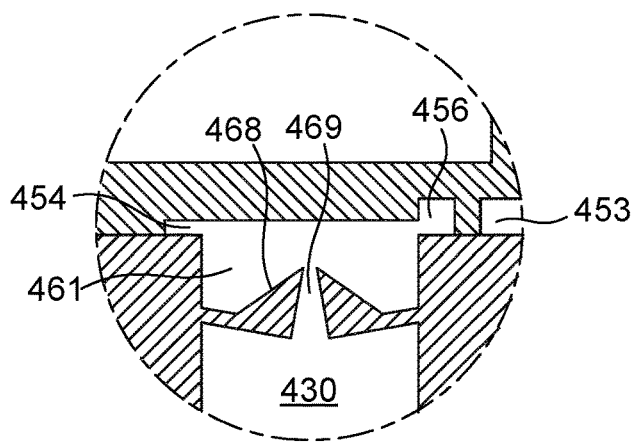
FIG. 19B illustrates part A of FIG. 14A in an enlarged manner in the case where the pressure of the irrigation liquid in the tube is equal to or higher than the second pressure value and lower than the third pressure value.
Figure 19C:
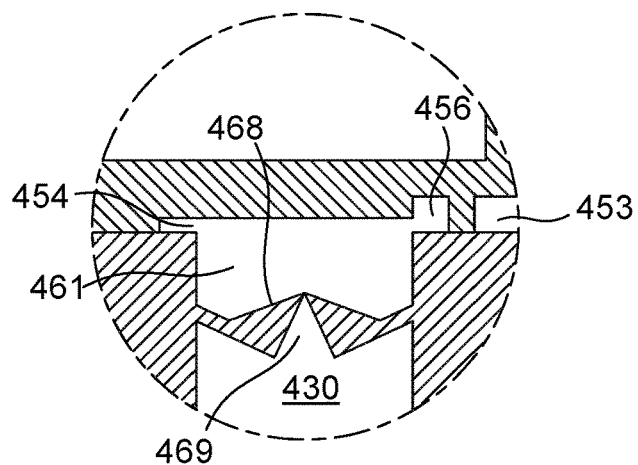
FIG. 19C illustrates part A of FIG. 14A in an enlarged manner in the case where the pressure of the irrigation liquid in the tube is equal to or higher than the third pressure value.

Next, discharge of irrigation liquid by emitter 320 is described. FIG. 19A illustrates part A of FIG. 14A in an enlarged manner in the case where the pressure of the irrigation liquid in tube 110 is equal to or higher than a first pressure value and lower than a second pressure value. FIG. 19B illustrates part A of FIG. 14A in an enlarged manner in the case where the pressure of the irrigation liquid in tube 110 is equal to or higher than the second pressure value and lower than the third pressure value. FIG. 19C illustrates part A of FIG. 14A in an enlarged manner in the case where the pressure of the irrigation liquid in tube 110 is equal to or higher than the third pressure value.

Supply of irrigation liquid to trickle irrigation tube 500 is performed in a range where the pressure of the irrigation liquid does not exceed 0.1 MPa for example in view of preventing the damaging of tube 110 and emitter 320. When the irrigation liquid is supplied into tube 110, the irrigation liquid reaches flow rate regulation valve 458 through first cylindrical part 410.

When the pressure of the irrigation liquid in tube 110 is equal to or higher than a first pressure value (for example 0.005 MPa), flow rate regulation valve 458 is pushed toward second plate part 460, and the slit of flow rate regulation valve 458 expands. In this manner, the irrigation liquid flows into flange part 420. Flow rate regulation valve 458 suppresses inflow of irrigation liquid into flange part 420 in the case where the pressure of the irrigation liquid is lower tm the first pressure value. The pressure of the irrigation liquid is lower tm the first pressure value. Thus, irrigation liquid can be supplied to the tube 110 with high pressure, and therefore the configuration in which emitter 320 includes flow rate regulation valve 458 is favorable for forming trickle irrigation tube 500 having a greater length, for example.

The irrigation liquid having passed through flow rate regulation valve 458 is supplied to groove 455 (pressure reduction channel). The pressure of the irrigation liquid flowing through groove 455 is reduced as a result of pressure loss caused by the shape (zigzag shape) in plan view of groove 455. In addition, floating materials in the irrigation liquid are entangled in the turbulent flow generated between the protrusions of groove 455 and are retained in groove 455. In this manner, the floating materials are further removed from the irrigation liquid by groove 455.

In addition, since the tip of the protrusion is disposed such that the tip of the protrusion does not exceed the center line of groove 455 in plan view, a space which is not blocked by the protrusion is formed at the center of groove 455 while the width of the space is small, and thus the irrigation liquid easily flow through groove 455. Accordingly, in addition to the effect of reducing pressure and the effect of removing the floating material, groove 455 is favorable for allowing irrigation liquid to flow with a greater flow rate.

The irrigation liquid having passed through groove 455 in which the pressure is reduced and the floating materials are removed is supplied into recess 461 through groove 456. Recesses 454 and 461 are filled with the irrigation liquid, and the irrigation liquid passes through gap 469 (FIG. 19A).

The irrigation liquid having passed through gap 469 reaches second cylindrical part 430 through recess 463, and is discharged out of tube 110 through second cylindrical part 430.

As the pressure of the irrigation liquid in tube 110 increases, the flow rate of the irrigation liquid received into emitter 320 from first cylindrical part 410 increases, and consequently the discharge rate of the irrigation liquid from second cylindrical part 430 increases.

When the pressure of the irrigation liquid in tube 110 is equal to or higher than the second pressure value (for example 0.02 MPa), the pressure of the irrigation liquid in recess 461 increases, and opening-closing part 468 is pushed by the irrigation liquid in recess 461 as illustrated in FIG. 19B. As a result, the bottom side part of the tilted surface of opening-closing part 468 bends (with the bottom side part as a fixed end) and opening-closing parts 468 are brought closer to each other, thus reducing gap 469. For example, the maximum width of gap 469 is changed to 0.15 mm Consequently, the area of the channel of gap 469 for irrigation liquid and the amount of the irrigation liquid passing through gap 469 are reduced, and thus increase of the discharge rate of the irrigation liquid from second cylindrical part 430 is suppressed.

When the pressure of the irrigation liquid in tube 110 is equal to or higher than a third pressure value (for example 0.05 MPa), the pressure of the irrigation liquid in recess 461 further increases, and, as illustrated in FIG. 19C, opening-closing part 468 is further pushed by the irrigation liquid in recess 461, and tip end portions of opening-closing part 468 make close contact with each other while gap 469 on the fixed ends of opening-closing parts 468 still remain. Thus, gap 469 is reduced to a minimum size. The irrigation liquid in recess 461 is supplied to recess 463 through gap 469 having the minimum size. Consequently, the amount of the irrigation liquid which passes through the flow rate controlling part is restricted to a flow rate which can pass through gap 469 having the minimum size, and the discharge rate of the irrigation liquid from second cylindrical part 430 becomes substantially constant. In this manner, emitter 320 quantitatively discharges the irrigation liquid from tube 110 supplied with the irrigation liquid.

When the pressure of the irrigation liquid in tube 110 is returned to the second pressure value, opening-closing part 468 is returned to the state illustrated in FIG. 19B, and when the pressure of the irrigation liquid in tube 110 is returned to the first pressure value, opening-closing part 468 is returned to the state illustrated in FIG. 19A. In this manner, in emitter 320, the amount of the irrigation liquid passing through gap 469 is controlled in accordance with the pressure of the irrigation liquid of recess 461. As described above, the pressure of the irrigation liquid in recess 461 varies in accordance with the pressure of the irrigation liquid in tube 110. Thus, according to emitter 320, the discharge rate of the irrigation liquid is controlled in accordance with the pressure of the irrigation liquid in tube 110.

(Effect)

As described, emitter 320 is an emitter to be disposed on a tube 110 for allowing irrigation liquid to flow therethrough, emitter 320 being configured for quantitatively discharging the irrigation liquid in tube 110 to outside of tube 110, emitter 320 comprising: the intake part for receiving the irrigation liquid in tube 110; the pressure reduction channel for allowing the irrigation liquid received from the intake part to flow therethrough while reducing a pressure of the irrigation liquid; the flow rate controlling part for controlling a flow rate of the irrigation liquid supplied from the pressure reduction channel in accordance with a pressure of the irrigation liquid supplied from the pressure reduction channel; the discharging part configured to be supplied with the irrigation liquid which is to be discharged to the outside of tube 110 and has a flow rate controlled by the flow rate controlling part. The flow rate controlling part includes gap 469 opening in a linear shape at recess 461 which is a channel on a downstream side of the pressure reduction channel and connected with the discharging part, a movable part having flexibility and including a free end facing gap 469 and a fixed end, the fixed end having a straight line shape and connecting both ends of gap 469, and a protrusion protruding along the free end from the movable part toward recess 461; and, when the pressure of the irrigation liquid in the channel is equal to or higher than a predetermined value, the movable part bends and the protrusion reduces a channel area of a channel of the irrigation liquid constituted by gap 469. Accordingly, emitter 320 controls the discharge rate of the irrigation liquid in accordance with the pressure of the irrigation liquid in the channel on the downstream side which varies depending on the pressure of the irrigation liquid in tube 110, and thus can stabilize the discharge rate of the irrigation liquid. Further, emitter 320 can be constituted with two injection-molded articles. Therefore, emitter 320 can further reduce manufacturing cost in comparison with conventional emitters composed of three parts.

In addition, emitter 320 includes: first cylindrical part 410 for constituting the intake part; flange part 420 for forming the pressure reduction channel and the flow rate controlling part, flange part 420 being connected with one end of first cylindrical part 410 and extending outward from the one end of first cylindrical part 410; and second cylindrical part 430 for constituting the discharge part, second cylindrical part 430 being connected on a side opposite to first cylindrical part 410 of flange part 420; emitter 320 is disposed on tube 110 by inserting first cylindrical part 410 into tube 110 from outside of tube 110; flange part 420 is composed of a combination of first plate part 450 connected with first cylindrical part 410 and second plate part 460 connected with second cylindrical part 430; first plate part 450 includes the pressure reduction channel; second plate part 460 includes recess 461 opening at a channel on a downstream side of the pressure reduction channel; recess 461 has a bottom having flexibility; and gap 469 opens at the bottom of recess 461. This configuration is further effective from the viewpoint of constituting emitter which can achieve the above-mentioned effect and is to be disposed on the outside of tube 110.

In addition, the protrusion has a shape like a triangular pyramid cut out from a polygonal pyramid along adjacent two sides of the polygonal pyramid which connect a tip end point and a bottom surface of the polygonal pyramid, and one of bottom sides of the triangular pyramid which is common to a bottom side of the polygonal pyramid is the fixed end, and each of remaining two sides is the free end. This configuration makes it possible to constitute the flow rate controlling part which operates in the above-mentioned manner by injection molding with one component, and is further effective from the viewpoint of reducing manufacturing cost.

In addition, with the configuration in which the intake part further includes flow rate regulation valve 458 for expanding the channel for the irrigation liquid when the pressure of the irrigation liquid in tube 110 is equal to or higher than a predetermined value, the irrigation liquid can be supplied to tube 110 with a higher pressure, and therefore the configuration is favorable from the standpoint of forming trickle irrigation tube 500 having a greater length.

In addition, with the configuration in which emitter 320 is molded with one material having flexibility, emitter 320 can be produced as one component by injection molding, and therefore the configuration is further effective from the standpoint of reducing manufacturing cost.

In addition, since opening-closing part 468 is formed in a right angle triangular pyramid-like shape, the boundary between opening-closing part 468 and the bottom of recess 461 is a base end edge of opening part 468 in the tilted surface, and has a straight line shape. Consequently, since the configuration in which the boundary between opening-closing part 468 and the bottom surface of recess 461 is a straight line is favorable for performing the opening and closing of the protrusion (opening-closing part 468) with a smaller force, the configuration is further effective from the viewpoint of precisely setting a predetermined discharge rate of the irrigation liquid in emitter 320.

When first cylindrical part 410 is inserted into tube 110 from the external side of tube 110, trickle irrigation tube 500 including tube 110 and emitter 320 disposed to tube 110 is provided. Trickle irrigation tube 500 can discharge irrigation liquid at a desired discharge rate. Accordingly, trickle irrigation tube 500 is favorably used for growing plants.

(Modification)

In trickle irrigation tube 500, the above-described configurations may be partially changed, or other configurations may be additionally provided as long as the above-described effect is achieved.

Figure 20A:
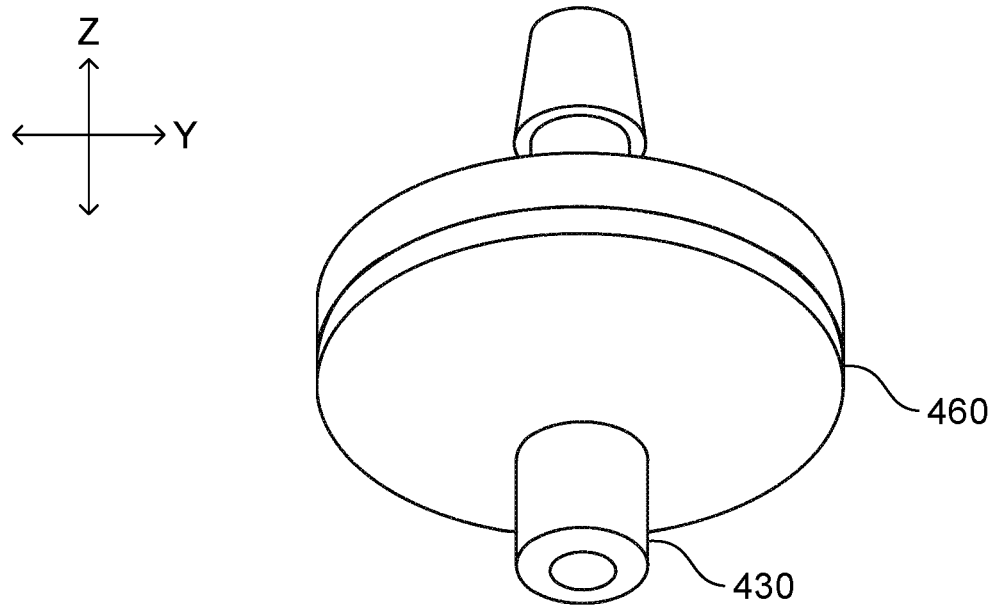
FIG. 20A schematically illustrates a first modification of a discharging part of the emitter according to the embodiment, and FIG. 20B schematically illustrates a second modification of the discharging part.
Figure 20B:
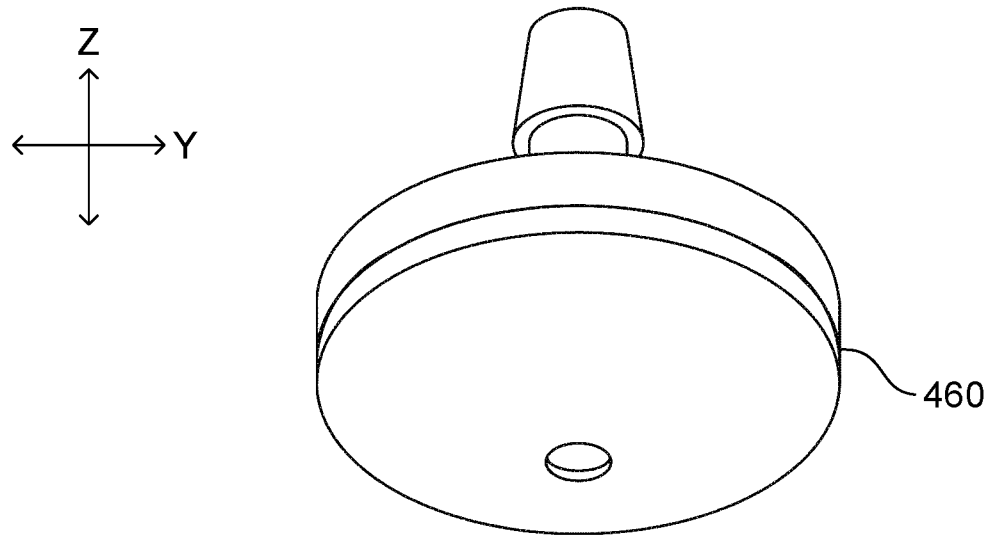

For example, second cylindrical part 430 may not have barb 431 as illustrated in FIG. 20A, and may be an opening part which opens at the second surface of second plate part 460 as illustrated in FIG. 20B.

In addition, tube 110 may be a seamless tube, a tube composed of slender sheet(s) joined together along the longitudinal direction, or a tube having a gap formed at the above-mentioned joining part of the sheets so as to communicate between the inside and the outside of tube 110, or a pipe sandwiched by the sheets at the joining part.

In addition, the first component and the second component may be integrally formed so as to be turnable about a hinge part integrally formed with the first component and the second component. In this case, the number of components of emitter 320 can be further reduced, that is, emitter 320 can be produced with one component.

While emitter 320 preferably include a pressure reduction channel having the above-mentioned shape from the viewpoint of ensuring a predetermined discharge rate, emitter 320 may not be provided with the pressure reduction channel. For example, while opening-closing part 468 operates with the pressure of the irrigation liquid in recess 461, the pressure reduction channel may not have the above-described shape (for example, may be a simple linear channel) as long as the channel from the intake part to the flow rate regulation part is a channel which generates the above-mentioned pressure for achieving a desired operation of opening-closing part 468.

In addition, flow rate control valve 464 may have polygonal shapes other than a square in plan view. For example, flow rate control valve 464 may have a triangular shape, or a hexagonal shape in plan view. Flow rate control valve 464 having a plan shape with a small number of angles is favorable for facilitating the contact between opening-closing parts 468 which operate with a high pressure, and flow rate control valve 464 having a plan shape with a large number of angles is favorable for increasing the difference of the flow rate of the irrigation liquid by the operation of opening-closing part 468.

In addition, as with opening-closing part 248 in Embodiment 1, opening-closing part 468 may include a hollow part illustrated in FIG. 21A and FIG. 21B. The configuration in which opening-closing part 468 is provided with the above-mentioned hollow part is favorable for constituting opening-closing part 468 with a molded article having a constant thickness, and therefore the configuration is further effective from the viewpoint of increasing the productivity of emitter 320 by injection molding.

In addition, one or a plurality of opening-closing parts 468 may be provided. For example, it is possible to adopt a configuration in which only a part of opening-closing parts 468 having a structure of a polygonal pyramid body divided with gap 469 is movable and the remaining parts are integrally provided such that gap 469 is not formed. Alternatively, it is possible to adopt a configuration in which only a part of opening-closing parts 468 is movable, and the remaining parts are fixed to each other with gap 469 therebetween. The opening and closing of opening-closing part 468 can be further readily designed with the configuration in which the number of movable opening-closing parts 468 is small, and the configuration in which the number of movable opening-closing part 468 is large is favorable for increasing the difference of the flow rate of the irrigation liquid by the operation of opening-closing part 468. It is to be noted that, when only one opening-closing part 468 is movable, the opening shape of gap 469 may be a V-shape composed of two linear slits intersecting each other. In addition, gap 469 may not be linear. In this manner, the opening shape of gap 469 may be a folded shape or a curved shape which sections opening-closing part 468.

This application is entitled to and claims the benefit of Japanese Patent Application No. 2014-003264 filed on Jan. 10, 2014, the disclosure each of which including the specification, drawings and abstract is incorporated herein by reference in its entirety.

INDUSTRIAL APPLICABILITY

According to the present invention, an emitter which can discharge liquid with an appropriate speed by the pressure of the liquid to be discharged can be easily provided. Accordingly, popularization of the above-mentioned emitter in technical fields of trickle irrigations, endurance tests and the like where long-term discharging is required, and further development of the technical fields can be expected.

REFERENCE SIGNS LIST

100, 500 Trickle irrigation tube
110 Tube
120, 320 Emitter
130 Discharge port
200 Emitter main body
201 First surface
202 Second surface
211, 212, 242, 251, 252, 253, 453, 454, 461, 463 Recess
213, 214, 254, 457 Linear protrusion
221 Intake channel
223, 458 Flow rate regulation valve
231, 232, 233, 241, 455, 456 Groove
234, 451 Hole
244, 464 Flow rate control valve
245, 255 Hollow part
248, 468 Opening-closing part
249, 469 Gap
300 Film
301 Hinge part
302 Opening part
410 First cylindrical part
411, 431 Barb
412, 432 Large diameter part
413, 433 Tapered part
420 Flange part
430 Second cylindrical part
450 First plate part
460 Second plate part
462 Linear recess

The invention claimed is:

1. An emitter to be disposed on a tube for allowing irrigation liquid to flow therethrough, the emitter being configured for quantitatively discharging the irrigation liquid in the tube to outside of the tube, the emitter comprising:
   an intake part for receiving the irrigation liquid in the tube;
   a pressure reduction channel for allowing the irrigation liquid received from the intake part to flow therethrough while reducing a pressure of the irrigation liquid;
   a flow rate controlling part for controlling a flow rate of the irrigation liquid supplied from the pressure reduction channel in accordance with a pressure of the irrigation liquid supplied from the pressure reduction channel;
   a discharging part configured to be supplied with the irrigation liquid which is to be discharged to the outside of the tube and has a flow rate controlled by the flow rate controlling part, wherein:
   the flow rate controlling part includes:
      a gap opening in a linear shape at a channel on a downstream side of the pressure reduction channel and communicated with the discharging part,
      a movable part having flexibility and including a free end facing the gap and a fixed end, the fixed end having a straight line shape and connecting both ends of the gap, and
      a protrusion protruding along the free end from the movable part toward an upstream side in a flow direction of the irrigation liquid; and,
   when the pressure of the irrigation liquid in the channel on the downstream side of the pressure reduction channel is equal to or higher than a predetermined value, the movable part bends and the protrusion reduces a channel area of a channel of the irrigation liquid constituted by the gap.

2. The emitter according to claim 1, wherein the intake part further includes a flow rate regulation valve configured to expand a channel of the irrigation liquid when the pressure of the irrigation liquid in the tube is equal to or higher than a predetermined value.

3. The emitter according to claim 1, wherein:
   the emitter is an emitter for quantitatively discharging the irrigation liquid in the tube from a discharge port, the emitter being configured to be joined to an inner wall surface of the tube at a position corresponding to the discharge port configured to communicate between inside and outside of the tube;
   the flow rate controlling part includes:
      a recess for constituting a part of the channel on the downstream side of the pressure reduction channel in the emitter, the recess opening at a surface of the emitter at a position where the surface of the emitter is not joined to the inner wall surface, and a lid part configured to seal the opening part and block communication between the channel on the downstream side of the pressure reduction channel and the inside of the tube;

the recess has a bottom having flexibility; and the gap opens at the bottom of the recess.

4. The emitter according to claim 1, wherein:

the protrusion has a shape like a triangular pyramid cut out from a polygonal pyramid along adjacent two sides of the polygonal pyramid which connect a tip end point and a bottom surface of the polygonal pyramid; and one of bottom sides of the triangular pyramid which is common to a bottom side of the polygonal pyramid is the fixed end, and each of remaining two sides is the free end.

5. The emitter according to claim 4, wherein the protrusion further includes a hollow part which opens to the discharging part side or to a side of the channel on the downstream side of the pressure reduction channel.

6. The emitter according to claim 3, wherein the emitter is molded with one material having flexibility.

7. A trickle irrigation tube comprising:

a tube; and at least one emitter, the emitter being the emitter according to claim 1 disposed on the tube.

8. The emitter according to claim 3, wherein:

the protrusion has a shape like a triangular pyramid cut out from a polygonal pyramid along adjacent two sides of the polygonal pyramid which connect a tip end point and a bottom surface of the polygonal pyramid; and one of bottom sides of the triangular pyramid which is common to a bottom side of the polygonal pyramid is the fixed end, and each of remaining two sides is the free end.

* * * * *